(12) United States Patent
Wang et al.

(10) Patent No.: US 9,203,877 B2
(45) Date of Patent: Dec. 1, 2015

(54) METHOD FOR MOBILE TERMINAL TO PROCESS TEXT, RELATED DEVICE, AND SYSTEM

(71) Applicant: Huawei Device Co., Ltd., Shenzhen, Guangdong (CN)

(72) Inventors: Lei Wang, Beijing (CN); Weiguang Kong, Beijing (CN); Shunan Fan, Beijing (CN); Wenmei Gao, Beijing (CN); Xiaoqiang Lv, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/485,433

(22) Filed: Sep. 12, 2014

(65) Prior Publication Data

US 2015/0024796 A1  Jan. 22, 2015

Related U.S. Application Data

(63) Continuation of application No. PCT/CN2013/072469, filed on Mar. 12, 2013.

(30) Foreign Application Priority Data

Mar. 12, 2012  (CN) .......................... 2012 1 0063489

(51) Int. Cl.
*H04W 4/18* (2009.01)
*H04L 29/06* (2006.01)
*H04M 3/00* (2006.01)
*G06F 17/30* (2006.01)
*G10L 13/00* (2006.01)
(Continued)

(52) U.S. Cl.
CPC ...... *H04L 65/1096* (2013.01); *G06F 17/30861*

(2013.01); *G10L 13/00* (2013.01); *H04L 65/4084* (2013.01); *H04L 65/4092* (2013.01); *H04L 65/605* (2013.01); *H04M 3/00* (2013.01); *H04M 3/42382* (2013.01); *H04W 4/18* (2013.01); *G10L 13/047* (2013.01); *H04M 2201/39* (2013.01); *H04M 2201/60* (2013.01)

(58) Field of Classification Search
None
See application file for complete search history.

(56) References Cited

U.S. PATENT DOCUMENTS

2008/0312760 A1   12/2008  Lee et al.
2009/0070113 A1*   3/2009  Gupta ..................... G10L 15/22
                                                          704/257

(Continued)

FOREIGN PATENT DOCUMENTS

CN     101325502 A    12/2008
CN     102119399 A     7/2011

(Continued)

*Primary Examiner* — Diane Mizrahi

(57) ABSTRACT

Embodiments of the present invention disclose a method for a mobile terminal to process text, a related device, and a system. The text processing method for a mobile terminal includes: sending a request message, which carries text information and start-processing position information, to a cloud application platform, where the text information includes at least one of or any combination of text to be processed, an obtaining address of the text to be processed, and an identifier of the text to be processed; and when or after receiving a response message, which is returned by the cloud application platform, of the request message, receiving and playing an audio stream from the cloud application platform. The technical solutions provided in the present invention can satisfy a requirement of a user for "listening to" text on a mobile terminal.

20 Claims, 8 Drawing Sheets

(51) Int. Cl.
*H04M 3/42* (2006.01)
*G10L 13/047* (2013.01)

(56) References Cited

U.S. PATENT DOCUMENTS

2009/0254345 A1 10/2009 Fleizach et al.
2010/0039510 A1 2/2010 Gold et al.
2013/0275899 A1* 10/2013 Schubert ............... G06F 3/0481
                                                        715/765

FOREIGN PATENT DOCUMENTS

| CN | 102137281 A | 7/2011 |
| CN | 102254550 A | 11/2011 |
| CN | 102629936 A | 8/2012 |

* cited by examiner

METHOD FOR MOBILE TERMINAL TO PROCESS TEXT, RELATED DEVICE, AND SYSTEM

CROSS-REFERENCE TO RELATED APPLICATIONS

This application is a continuation of international Application No. PCT/CN2013/072469, filed on Mar. 12, 2013, which claims priority to Chinese Patent Application No. 201210063489.8, filed on Mar. 12, 2012, both of which are hereby incorporated by reference in their entireties.

TECHNICAL FIELD

The present invention relates to the communications field, and in particular, to a method for a mobile terminal to process text, a related device, and a system.

BACKGROUND

In the era of mobile Internet, text processing on a mobile terminal (for example, a mobile phone, a mobile terminal like a tablet computer, an electronic book, or the like), compared with text processing on a conventional physical book or on a computer, has advantages of convenience in carrying and reading almost at any time and any place, and has characteristics of timeliness and interaction compared with the conventional physical book (where the text is available for reading before an author finishes writing, and a comment may be provided to the author in a manner of leaving a message or the like, or a reader can even participate in discussion about future content). Therefore, text processing on a mobile terminal is increasingly popular with many users, and becomes an important service application of the mobile Internet.

With the development of the scientific era, requirements of a user on capability of a mobile terminal are increasing. For example, the user expects that a mobile terminal can "read aloud" the text. However, because of a limit on computing and processing capability of the mobile terminal itself and on storage space, it is very difficult to convert text into speech on the mobile terminal to satisfy a requirement of the user for "listening to" the text. Therefore, how to implement capability of a mobile terminal for "reading aloud" text becomes a problem that is always under discussion by those in the industry.

SUMMARY

Embodiments of the present invention provide a method for a mobile terminal to process text, a related device, and a system, thereby satisfying a requirement of a user for "listening to" text on a mobile terminal.

In order to solve the foregoing technical problem, the embodiments of the present invention provide the following technical solutions:

In one aspect, a method for a mobile terminal to process text is provided and includes:

sending a request message, which carries text information and start-processing position information, to a cloud application platform, so that the cloud application platform obtains, according to the text information, text to be processed, where the text information includes at least one of or any combination of the text to be processed, an obtaining address of the text to be processed, and an identifier of the text to be processed; and when or after obtaining a response message, which is returned by the cloud application platform, of the request message, receiving and playing an audio stream from the cloud application platform, where the audio stream is obtained by the cloud application platform according to the text to be processed and the start-processing position information, and the start-processing position information is used to determine a starting point of the audio stream.

In another aspect, a method for a mobile terminal to process text is further provided and includes:

receiving, by a first mobile terminal, a response message from a cloud application platform, where the response message is sent by the cloud application platform, after receiving a request message, which carries text information, start-processing position information, and identifier information of the first mobile terminal, from a second mobile terminal, to the first mobile terminal according to the identifier information of the first mobile terminal, where the text information includes at least one of or any combination of text to be processed, an obtaining address of the text to be processed, and an identifier of the text to be processed; and receiving and playing, by the first mobile terminal, an audio stream from the cloud application platform, where the audio stream is obtained by the cloud application platform according to the text to be processed and the start-processing position information, the text to be processed is obtained by the cloud application platform according to the text information, and the start-processing position information is used to determine a starting point of the audio stream.

In another aspect, a method for a mobile terminal to process text is further provided and includes:

receiving a request message, which is sent by a mobile terminal and carries text information and start-processing position information, where the text information includes at least one of or any combination of text to be processed, an obtaining address of the text to be processed, and an identifier of the text to be processed; sending a response message to the mobile terminal; obtaining, according to the text information, the text to be processed; obtaining an audio stream according to the text to be processed and the start-processing position information, where the start-processing position information is used to determine a starting point of the audio stream; and transmitting the audio stream to the mobile terminal.

In another aspect, a method for a mobile terminal to process text is further provided and includes:

receiving, from a second mobile terminal, a request message, which carries text information, start-processing position information, and identifier information of a first mobile terminal, where the text information includes at least one of or any combination of text to be processed, an obtaining address of the text to be processed, and an identifier of the text to be processed; sending a response message to the first mobile terminal according to the identifier information of the first mobile terminal; obtaining, based on the text information, the text to be processed; obtaining an audio stream according to the text to be processed and the start-processing position information, where the start-processing position information is used to determine a starting point of the audio stream; and transmitting the audio stream to the first mobile terminal.

In another aspect, a mobile terminal is further provided and includes:

a sender, configured to send a request message, which carries text information and start-processing position information, to a cloud application platform, so that the cloud application platform obtains, according to the text information, text to be processed, where the text information includes at least one of or any combination of the text to be processed, an obtaining address of the text to be processed, and an identifier of the text to be processed; a receiver, configured to receive a response message, which is returned by the cloud application platform, of the request message; and a playing unit, configured to receive and play, when or after the receiver receives the response message, which is returned by the cloud application platform, of the request message, an audio stream from the cloud application platform, where the audio stream is obtained by the cloud application platform according to the text to be processed and the start-processing position information, and the start-processing position information is used to determine a starting point of the audio stream.

In another aspect, a mobile terminal is further provided and includes:

a receiver, configured to receive a response message from a cloud application platform, where the response message is sent by the cloud application platform, after receiving a request message, which carries text information, start-processing position information, and identifier information of a first mobile terminal, from a second mobile terminal, to the first mobile terminal according to the identifier information of the first mobile terminal, where the text information includes at least one of or any combination of text to be processed, an obtaining address of the text to be processed, and an identifier of the text to be processed; and a playing unit, configured to receive and play an audio stream from the cloud application platform, where the audio stream is obtained by the cloud application platform according to the text to be processed and the start-processing position information, the text to be processed is obtained by the cloud application platform according to the text information, and the start-processing position information is used to determine a starting point of the audio stream.

In another aspect, a cloud application platform is further provided and includes:

a receiver, configured to receive a request message, which is sent by a mobile terminal and carries text information and start-processing position information, where the text information includes at least one of or any combination of text to be processed, an obtaining address of the text to be processed, and an identifier of the text to be processed; a sender, configured to send a response message to the mobile terminal when the receiver receives the request message; an obtaining unit, configured to obtain, according to the text information, the text to be processed, and obtain an audio stream according to the text to be processed and the start-processing position information, where the start-processing position information is used to determine a starting point of the audio stream; and a transmitting unit, configured to transmit the audio stream to the mobile terminal.

In another aspect, a cloud application platform is further provided and includes:

a receiver, configured to receive, from a second mobile terminal, a request message, which carries text information, start-processing position information, and identifier information of a first mobile terminal, wherein the text information comprises at least one of or any combination of text to be processed, an obtaining address of the text to be processed, and an identifier of the text to be processed; a sender, configured to send, when the receiver receives the request message, a response message to the first mobile terminal according to the identifier information of the first mobile terminal; an obtaining unit, configured to obtain, based on the text information, the text to be processed, and obtain an audio stream according to the text to be processed and the start-processing position information, wherein the start-processing position information is used to determine a starting point of the audio stream; and a transmitting unit, configured to transmit the audio stream obtained by the obtaining unit to the first mobile terminal.

In another aspect, a text processing system is further provided and includes:

a cloud application platform and a mobile terminal; where the cloud application platform is configured to: receive a request message, which is sent by the mobile terminal and carries text information and start-processing position information, where the text information includes at least one of or any combination of text to be processed, an obtaining address of the text to be processed, and an identifier of the text to be processed; send a response message to the mobile terminal; obtain, according to the text information, the text to be processed; obtain an audio stream according to the text to be processed and the start-processing position information, where the start-processing position information is used to determine a starting point of the audio stream; and transmit the audio stream to the mobile terminal; and the mobile terminal is configured to: send the request message, which carries the text information and the start-processing position information, to the cloud application platform; and when or after receiving the response message, which is returned by the cloud application platform, of the request message, receive and play the audio stream from the cloud application platform.

In another aspect, a text processing system is further provided and includes:

a first mobile terminal, a second mobile terminal, and a cloud application platform; where the second mobile terminal is configured to send a request message, which carries text information, start-processing position information, and identifier information of the first mobile terminal, to the cloud application platform, where the text information includes at least one of or any combination of text to be processed, an obtaining address of the text to be processed, and an identifier of the text to be processed; the cloud application platform is configured to: receive, from the second mobile terminal, the request message, which carries the text information, the start-processing position information and the identifier information of the first mobile terminal; send a response message to the first mobile terminal according to the identifier information of the first mobile terminal; obtain, based on the text information, the text to be processed; and obtain an audio stream according to the text to be processed and the start-processing position information, where the start-processing position information is used to determine a starting point of the audio stream; and the first mobile terminal is configured to: receive the response message from the cloud application platform; and receive and play the audio stream from the cloud application platform.

According to the foregoing description, in the embodiments of the present invention, a mobile terminal sends a text-listening request message to a cloud application platform, and notifies, in the text-listening request message, the cloud application platform of text to be listened to; and the cloud application platform obtains, after receiving the text-listening request message of the mobile terminal, an audio stream corresponding to the text to be listened to by the mobile terminal, and transmits the audio stream to the mobile terminal, so that the mobile terminal receives and plays the audio stream, thereby satisfying a requirement of a user for "listening to" text on a mobile terminal.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Embodiments of the present invention provide a method for a mobile terminal to process text, a related device, and a system.

To make the invention objectives, features, and advantages of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
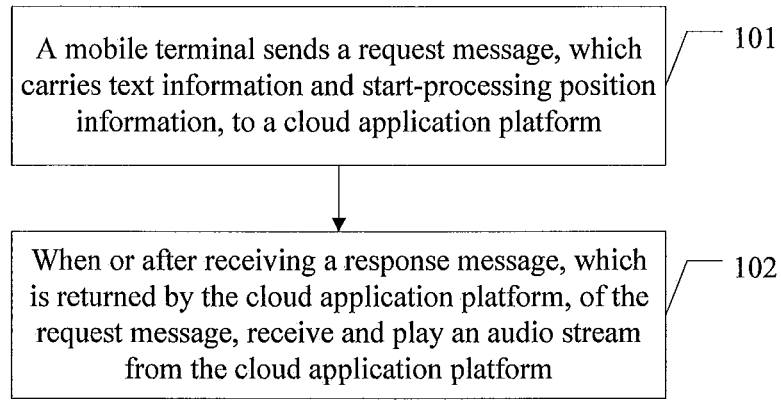
FIG. 1 is a schematic flowchart illustrating text processing performed by a mobile terminal according to an embodiment of the present invention.

The following describes a method for a mobile terminal to process text according to an embodiment of the present invention by using a mobile terminal side as a description subject, which, as shown in FIG. 1, includes:

101. A mobile terminal sends a request message, which carries text information and start-processing position information, to a cloud application platform.

In the embodiment of the present invention, the request message may be a Hypertext Transfer Protocol (HTTP, Hypertext Transfer Protocol) request message (for example, an HTTP POST message). Alternatively, the cloud application platform may also allocate a specific uniform resource locator (URL, Uniform Resource Locator) to the mobile terminal for providing a reading-to-listening service; accordingly, the request message may be a message directed to the URL so that the cloud application platform learns that the mobile terminal is to trigger the reading-to-listening service.

The text information includes at least one of or any combination of text to be processed, an obtaining address of the text to be processed, and an identifier of the text to be processed, so that the cloud application platform obtains, by using the text information, the text to be processed, where the text to be processed is text requested by the mobile terminal to listen to.

It should be noted that the text to be processed includes but is not limited to a document, content or an image on a webpage on the mobile terminal.

For example, if the text information includes at least one of the obtaining address of the text to be processed and the identifier of the text to be processed, the cloud application platform may obtain, according to the obtaining address and/or identifier, carried in the text information, of the text to be processed, the text to be processed from a local database or another network device. Normally, the cloud application platform obtains full text according to the obtaining address and/or identifier of the text to be processed. However, it is possible that the mobile terminal does not need to start listening from the beginning of the full text. For example, the mobile terminal requests listening to text content starting from paragraph 5 of a novel "A", and the mobile terminal sends an identifier and/or obtaining address of "A" to the cloud application platform; the cloud application platform obtains "A" according to the identifier and/or obtaining address of "A", but does not know that the mobile terminal only needs to start listening from paragraph 5 of "A". In the embodiment of the present invention, the cloud application platform may, after obtaining the text to be processed and according to the start-processing position information, learn a position of the text to be processed for starting processing. The start-processing position information may be, for example, one paragraph of the text to be processed, or one sentence or several sentences of one paragraph of the text to be processed, where no limit is set herein.

For another example, the text information may also include the text to be processed. For example, in the foregoing example, if the mobile terminal requests listening to paragraph 5 in the novel "A", the text information may include content of paragraph 5 in the novel "A".

102. The mobile terminal, when or after receiving a response message, which is returned by the cloud application platform, of the request message, receives and plays an audio stream from the cloud application platform.

In the embodiment of the present invention, when or after the mobile terminal receives the response message, which is returned by the cloud application platform, of the request message, it indicates that the cloud application platform has received and processed the text-listening request sent by the mobile terminal. In this case, the mobile terminal may receive and play the audio stream from the cloud application platform. The audio stream may be obtained by the cloud application platform based on the text information and the start-processing position information after receiving the text-listening request of the mobile terminal. For example, the cloud application platform may obtain, based on the text information, the text to be processed, and then perform, starting from a starting position, to which the start-processing position information is directed, of the text to be processed, text-to-speech (TTS, Text To Speech) processing on the text to be processed, thereby obtaining the audio stream. Indeed, the cloud application platform may also reuse an audio stream that has been converted and matches the text to be processed, where no limit is set herein. A starting point of the audio stream received and played by the mobile terminal is determined by the cloud application platform based on the start-processing position information. In other words, the start-processing position information is used to determine the starting point of the audio stream. The starting point of the audio stream refers to a position on a play timeline for starting playing the audio stream.

The mobile terminal may, by using a real time streaming protocol (RTSP, Real Time Streaming Protocol), control the cloud application platform to transmit the audio stream to the mobile terminal itself, thereby implementing receiving the audio stream in a manner of streaming media. Alternatively, the mobile terminal may also, in an http streaming manner, control the cloud application platform to transmit the audio stream to the mobile terminal itself, thereby implementing receiving the audio stream in the manner of streaming media. Indeed, the cloud application platform may also carry the audio stream in the response message, and the mobile terminal extracts, when receiving the response message, the audio stream from the response message and plays the audio stream, where no limit is set herein.

Further, in a process for the mobile terminal to receive and play the audio stream, a user may also, by entering a stop-listening instruction to the mobile terminal, control the mobile terminal to stop playing the audio stream. In one application scenario, the mobile terminal sends, when receiving the stop-listening instruction, a stop-listening message to the cloud application platform, so that the cloud application platform stops transmitting the audio stream to the mobile terminal.

Further, before or after the mobile terminal sends the stop-listening message to the cloud application platform, the following is further included: obtaining, by the mobile terminal, a text position mark, where the text position mark is used to indicate a stopping position, corresponding to a stopping point of the audio stream, of corresponding content in the text to be processed; and displaying text content to which the text position mark is directed, where the text position mark is used to indicate a position, corresponding to the stopping point of the audio stream, of corresponding content in the text to be processed. It should be noted that the stopping point of the audio stream involved in the embodiment of the present invention refers to a position on the play timeline for stopping playing the audio stream when the mobile terminal receives the stop-listening instruction. In an actual application, when the mobile terminal stops listening to the audio stream, the mobile terminal records the stopping point of the audio stream, and obtains the text position mark according to the stopping point of the audio stream. Alternatively, the mobile terminal may also send the recorded stopping point of the audio stream to the cloud application platform, and the cloud application platform obtains the text position mark according to the stopping point of the audio stream, and the cloud application platform sends the text position mark to the mobile terminal.

Alternatively, the mobile terminal outputs and displays, before or after sending the stop-listening message to the cloud application platform, text content to which the text position mark is directed. Indeed, whether to display the text content to which the text position mark is directed may also be set by the user on the mobile terminal.

Further, in the process for the mobile terminal to receive and play the audio stream, the user may also, by entering an instruction to the mobile terminal for continuing to listen on another mobile terminal, control the mobile terminal to transfer to another mobile terminal to continue to listen to the text. In one application scenario, the mobile terminal sends, when receiving the instruction for continuing to listen on the other mobile terminal, a request message, which carries identifier information of the other mobile terminal and a listen-continuing instruction, to the cloud application platform, where the identifier information of the other mobile terminal may be, for example, an equipment identity, address, number, or international mobile equipment identity (IMEI, International Mobile Equipment Identity) number of the other mobile terminal, thereby triggering, by using the listen-continuing instruction, the cloud application platform to continue to transmit the audio stream to the another mobile terminal. A starting time point for the cloud application platform to continue to transmit the audio stream to the other mobile terminal may be determined according to the received request message, which carries the identifier information of the other mobile terminal and the listen-continuing instruction. For example, it may be set that the cloud application platform continues to transmit the audio stream to the other mobile terminal after delaying for a specific time interval upon the reception of the request message, which carries the identifier information of the other mobile terminal and the listen-continuing instruction. It should be noted that the delaying time interval includes zero. No limit is set to a length of the time interval and the time interval may be preset or adjusted. Alternatively, the request message, which carries the identifier information of the other mobile terminal and the listen-continuing instruction, may further carry the delaying time interval or other information for determining a starting time point for transmitting the audio stream to the other mobile terminal. Further (for the convenience of differentiating between the mobile terminal and the other mobile terminal, the mobile terminal is replaced with a mobile terminal 1 for description and the another mobile terminal is replaced with a mobile terminal 2 for description hereinafter in the scenario), when text is listened to on the mobile terminal 2, the mobile terminal 1 may further request the cloud application platform to return to the mobile terminal 1 to continue to listen to or display the text, or to synchronously listen to or display the text on the mobile terminal 1 and one or more other mobile terminals (including the mobile terminal 2) at the same time. Alternatively, the mobile terminal 2 may also request the cloud application platform to transfer to the mobile terminal 1 or another mobile terminal to continue to listen to or display the text. Alternatively, the mobile terminal 2 may also request, to the cloud application platform, synchronously continuing to listen to or display the text on the mobile terminal 1 and one or more other mobile terminals (including the mobile terminal 2) at the same time.

Further, in the process for the mobile terminal to receive and play the audio stream, the user may also, by entering an instruction to the mobile terminal for continuing to read on another mobile terminal, control the mobile terminal to transfer to the other mobile terminal to continue to display the text. In one application scenario, the mobile terminal sends, when receiving the instruction for instructing to continue to read on the other mobile terminal, a request message, which carries identifier information of the other mobile terminal and a read-continuing instruction, to the cloud application platform, where the identifier information of the other mobile terminal may be, for example, an equipment identity, address, number, or IMEI number of the other mobile terminal, thereby triggering, by using the read-continuing instruction, the cloud application platform to send text record information to the other mobile terminal, where the text record information includes at least one of the text to be processed, the identifier of the text to be processed, or the obtaining address of the text to be processed, and a text position mark marking a stop-processing position of the text to be processed, so that the another mobile terminal obtains, by using the text record information, the text to be processed, and locally displays text content to which the text position mark is directed. Further (for the convenience of differentiating between the mobile terminal and the other mobile terminal, the mobile terminal is replaced with a mobile terminal 1 for description and the other mobile terminal is replaced with a mobile terminal 2 for description hereinafter in the scenario), when text is displayed on the mobile terminal 2, the mobile terminal 1 may further request the cloud application platform to return to the mobile terminal 1 to continue to listen to or display the text, or to synchronously listen to or display the text on the mobile terminal 1 and one or more other mobile terminals (including the mobile terminal 2) at the same time. Alternatively, the mobile terminal 2 may also request the cloud application platform to transfer to the mobile terminal 1 or another mobile terminal to continue to listen to or display the text. Alternatively, the mobile terminal 2 may also request, to the cloud application platform, synchronously continuing to listen to or display the text on the mobile terminal 1 and one or more other mobile terminals (including the mobile terminal 2) at the same time.

In an actual application, the cloud application platform automatically ends the listening procedure if the entire audio stream corresponding to the text to be listened to as requested by the mobile terminal is transmitted.

The mobile terminal in the embodiment of the present invention may be a mobile terminal that can implement text reading, such as a mobile phone, a computer, or an electronic book apparatus, and the cloud application platform in the embodiment of the present invention may be a server, where no limit is set herein.

According to the foregoing description, in the embodiment of the present invention, a mobile terminal sends a request message, which carries text information and start-processing position information, to a cloud application platform; and when or after receiving a response message, which is returned by the cloud application platform, of the request message, receives and plays an audio stream from the cloud application platform, which satisfies a requirement of a user for "listening to" text on a mobile terminal.

Figure 2:
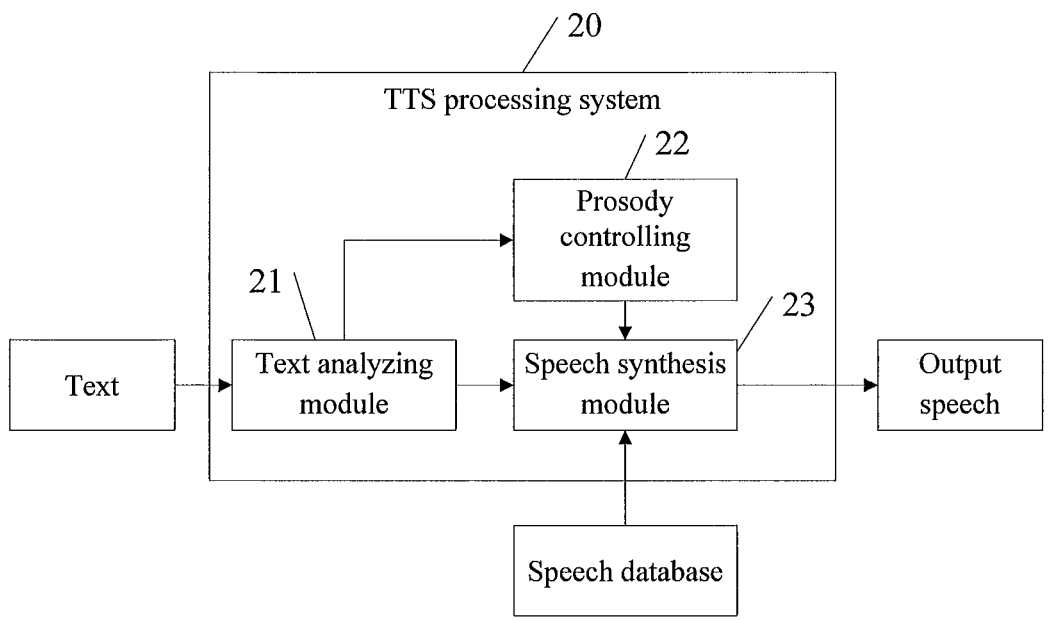
FIG. 2 is a schematic structural diagram of a TTS processing system according to an embodiment of the present invention.

The embodiments of the present invention involve TTS processing; therefore, a TTS technology Used in the embodiments of the present invention is first described as follows:

A process of TTS processing is normally divided into text processing, prosody processing, and synthesis processing. Generally, a TTS system is primarily divided into three parts. As shown in FIG. 2, a TTS processing system 20 includes a text analyzing module 21, a prosody controlling module 22, and a speech synthesis module 23. The three modules are respectively described as follows:

The text analyzing module 21: The TTS system first needs to process text, that is, content that it needs to say. A main function of the text analyzing module 21 is to enable a computer to recognize letters from the text, to know which sound needs to be pronounced and how to make pronunciation, and then notify the computer of a pronunciation manner. In addition, the computer also needs to be notified of words, phrases, and sentences in the text, and a position of a pause and a pause duration during pronunciation. An operation process of the text analyzing module 21 may be divided into three main steps:

1. Normalize text that is input. In this process, a spelling mistake needs to be found and some irregular characters or characters that cannot be pronounced, which appear in the text, need to be filtered out.

2. Analyze a boundary of words or phrases in the text, determine pronunciation of a letter, and analyze pronunciation of numerals, surnames, special characters, proper words, and various words having more than one pronunciation.

3. Determine a change in a tone and stress during pronunciation according to a structure and composition of the text and punctuation appearing at different positions. Eventually, the text analyzing module 21 converts the input characters into an internal parameter that the computer can process, thereby facilitating processing by other modules and generating corresponding information.

The prosody controlling module 22: A prosodic feature exists when anybody speaks. For example, in Chinese, a syllable has different tones, intonations, and pause manners, and pronunciation lengths are also different. All these belong to prosodic features. Accordingly, a prosodic parameter includes an acoustic parameter affecting these features, such as a fundamental frequency, a duration, intensity, and the like. A result of text analyzing notifies the computer of what to pronounce and how to pronounce; however, this pronunciation manner is abstract. Specific prosodic parameters, such as the second tone or the third tone is to be pronounced, stressed or unstressed, a pausing position, and like, which are used by the system to synthesize a sound signal depend on the prosody controlling module 22. Similar to a method for implementing the text processing module 21, a method for generating prosody is also divided into two methods, rule-based and data-driven. Early methods for generating prosody all use the rule-based method. This kind of method requires that a researcher have a large amount of background knowledge about phonology, and requires summarization and induction on detailed information about a change in the acoustic parameters such as the fundamental frequency, duration, and intensity in various specific cases, for example, different positions of a sound in a sentence, different tones, different intonations of a sentence, and even different parts of speech. Because different languages have different prosodic features, for different languages, prosodic features that are related to the languages must be found. At present, a rule-based method is still considered as an effective method, and most Chinese speech synthesis systems still use this kind of method. Despite the efforts of researchers, this kind of method can produce a good prosody generating effect but is subject to many limitations. According to the foregoing description, the rule-based method requires that a system designer spend a large amount of time and energy in studying prosodic features that are universal in different languages, which is a very time-consuming task. Moreover, due to complexity of rules, naturalness of speech synthesized thereby is also subject to many limitations, which also limits some functions thereof. In addition, a rule-based system normally seeks naturalness of pronunciation only, which conceals individual characteristics of people. If the system is made to simulate pronunciation of a specific person, the system seems powerless unless some dedicated models are designed for the person. In the embodiment of the present invention, prosody is generated by using a neural network or a statistics-driven method, and implementation steps thereof are as follows: design or collect a database including a large amount of speech and text information; then, establish a training model, and train the model by using a prosodic parameter that is extracted from the database, thereby obtaining a final prosodic model through training. An advantage of this prosodic model lies in that prosody generating capacity of a system is retained and even enhanced, and flexibility of the overall speech synthesizing system is greatly improved, which facilitates simulating prosodic features of a specific person, and creates a condition for integrating multiple languages in the same speech synthesizing system.

The speech synthesis module 23: Synthesized speech generated by the system is specifically implemented by using an acoustic module. In the embodiment of the present invention, a waveform concatenation (that is, PSOLA) algorithm is used to implement speech synthesis. A core idea of this method is direct concatenate, by using the PSOLA algorithm, speech stored in a speech database, thereby forming complete speech. Unlink a conventional concept where different speech units are only concatenated simply, the system first selects a most appropriate speech unit for concatenation from a large speech database, where multiple complex technologies, including multiple technologies in statistics or neural network technologies, are normally used in a process of speech selection; and eventually, when performing concatenation, uses the PSOLA algorithm to modify prosodic features of the speech synthesized thereby, so that the synthesized speech has very high sound quality. Because capacity of a sound database of a speech database normally is very huge, and needs to occupy a large amount of storage space, it is very difficult to promote the system to a personal digital assistant or some small mobile terminal devices. In addition, during concatenation, discontinuity of frequencies between two adjacent sound units is also likely to cause quality of synthetic speech to decline. At present, a good approach for solving these problems is combining the method with a parameter synthesis method.

Main steps of speech synthesis for prosodic adjustment are as follows: obtain a required fundamental frequency and duration factor according to a prosody control symbol generated according to a prosodic rule; transform a pitch synchronization flag in the sound database, including inserting or deleting a pitch synchronization flag and improving or reducing a symbol gap; multiplying a Hamming window by an original speech waveform (where a window length is twice a period of the pitch) to obtain a series of short-duration signals; and then, perform superposition according to the transformed pitch synchronization flag to calculate a waveform to be played.

Figure 3:
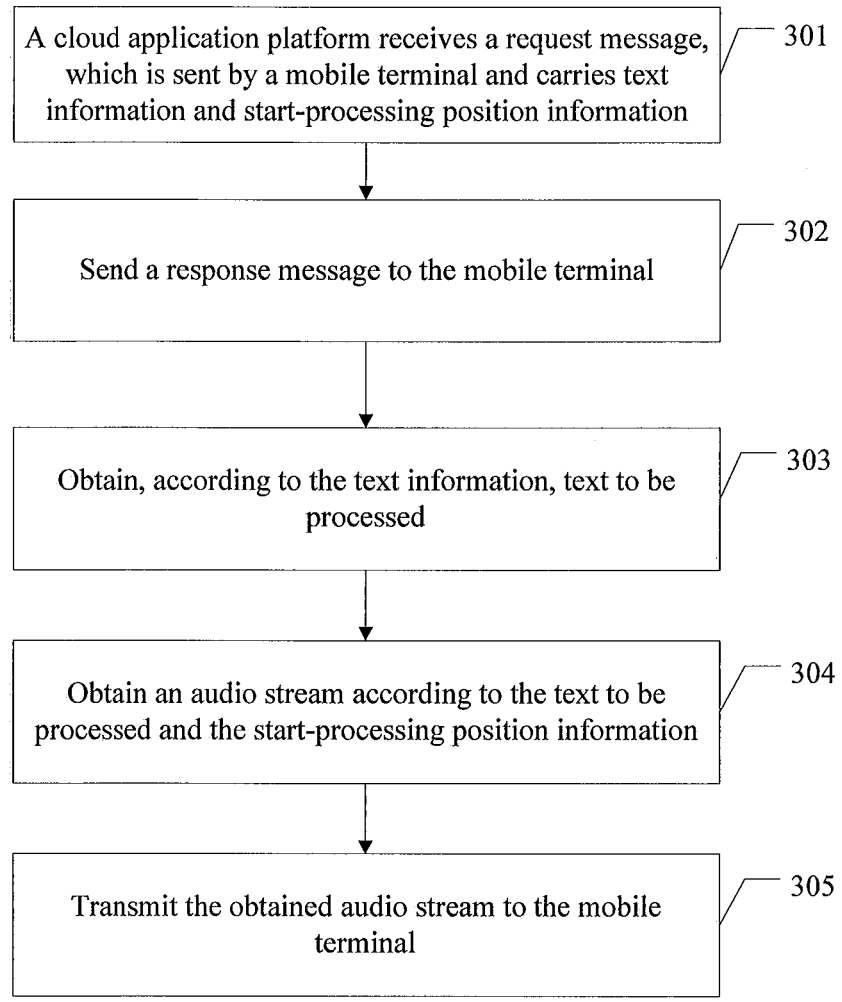
FIG. 3 is a schematic flowchart illustrating text processing performed by a mobile terminal according to another embodiment of the present invention.

The following describes a method for a mobile terminal to process text according to an embodiment of the present invention by using a cloud application platform as a description subject. Referring to FIG. 3, the method includes:

301. A cloud application platform receives a request message, which is sent by a mobile terminal and carries text information and start-processing position information.

In the embodiment of the present invention, the request message may be a HyperText Transfer Protocol (HTTP, Hypertext Transfer Protocol) request message (for example, an HTTP POST message). Alternatively, the cloud application platform may also allocate a specific uniform resource locator (URL, Uniform Resource Locator) to the mobile terminal for providing a reading-to-listening service; accordingly, the request message may be a message directed to the URL so that the cloud application platform learns that the mobile terminal is to trigger the reading-to-listening service.

302. The cloud application platform sends a response message to the mobile terminal.

The cloud application platform, after receiving the request message, learns that the mobile terminal is to trigger a reading-to-listening service, and sends the response message to the mobile terminal, so that the mobile terminal learns that the cloud application platform successfully receives the request message, and the mobile terminal gets prepared to receive an audio stream corresponding to text requested by the mobile terminal to listen to.

The text information includes at least one of an obtaining address of text to be processed, an identifier of the text to be processed or the text to be processed, where the text to be processed refers to the text requested by the mobile terminal to listen to.

It should be noted that the text to be processed includes but is not limited to a document, content or an image on a webpage on the mobile terminal, or the like.

303. The cloud application platform obtains, according to the text information, the text to be processed.

The cloud application platform obtains, by using the text information, the text to be processed.

For example, if the text information includes at least one of the obtaining address of the text to be processed and the identifier of the text to be processed, the cloud application platform may obtain, according to the obtaining address and/or identifier, which is carried in the text information, of the text to be processed, the text to be processed from a local database or another network device. Normally, the cloud application platform obtains full text according to the obtaining address and/or identifier of the text; however, it is possible that the mobile terminal does not need to start listening from the beginning of the full text. Therefore, in the embodiment of the present invention, the cloud application platform may learn, after obtaining the text to be processed and according to the start-processing position information, a position of the text to be processed for starting processing. The start-processing position may be, for example, one paragraph of the text to be processed, or one sentence or several sentences of one paragraph of the text to be processed, where no limit is set herein.

For another example, if the text information includes the text to be processed, the cloud application platform may directly obtain the text to be processed from the information about the text to be processed.

304. The cloud application platform obtains an audio stream according to the text to be processed and the start-processing position information.

In the embodiment of the present invention, the cloud application platform starts, after obtaining the text to be processed, performing TTS processing on the text to be processed, thereby obtaining an audio stream, where the start-processing position information is used to determine a starting point of the audio stream. The starting point of the audio stream refers to a position on a play timeline for starting playing the audio stream.

In order to save resources and relieve a TTS processing load, the cloud application platform may store the audio stream obtained by performing TTS processing, and create a mapping relationship between an audio time point of the audio stream and a text position, so that the cloud application platform may reuse content obtained by performing TTS processing before.

305. The cloud application platform transmits the obtained audio stream to the mobile terminal.

In the embodiment of the present invention, the cloud application platform may transmit the audio stream to the mobile terminal based on an RTSP protocol, or the cloud application platform may also transmit the audio stream to the mobile terminal in an http streaming manner, where no limit is set herein.

Further, the obtaining an audio stream according to the text to be processed and the start-processing position information includes:

determining a start-processing position according to the start-processing position information, performing text-to-speech conversion on text content, starting from the start-processing position, of the text to be processed, and obtaining an audio stream corresponding to the text content, starting from the start-processing position, of the text to be processed.

Further, in a process for the mobile terminal to receive and play the audio stream, a user may also, by entering a stop-listening instruction to the mobile terminal, control the mobile terminal to stop playing the audio stream. In one application scenario, the mobile terminal sends, when receiving the stop-listening instruction, a stop-listening message to the cloud application platform, so that the cloud application platform stops transmitting the audio stream to the mobile terminal after receiving the stop-listening message. Further, the stop-listening message received by the cloud application platform may carry a text position mark, where the text position mark is used to indicate a stopping position, corresponding to the stopping point of the audio stream, of corresponding content in the text to be processed. Alternatively, the cloud application platform may record the text position mark.

Further, in the process for the mobile terminal to receive and play the audio stream, the user may also, by entering an instruction to the mobile terminal for continuing to listen on another mobile terminal, control the mobile terminal to transfer to the other mobile terminal to continue to listen to the text. In one application scenario, the mobile terminal sends, when receiving the instruction for continuing to listen on the other mobile terminal, a request message, which carries identifier information of the other mobile terminal and a listen-continuing instruction, to the cloud application platform, where the identifier information of the other mobile terminal may be, for example, an equipment identity, address, number, or IMEI number of the other mobile terminal. The cloud application platform continues, after receiving the request message, to transmit the audio stream to the other mobile terminal under the instruction of the listen-continuing instruction. A starting time point for the cloud application platform to continue to transmit the audio stream to the other mobile terminal may be determined according to the received request message, which carries the identifier information of the other mobile terminal and the listen-continuing instruction. For example, it may be set that the cloud application platform continues to transmit the audio stream to the other mobile terminal after delaying for a specific time interval upon the reception of the request message, which carries the identifier information of the other mobile terminal and the listen-continuing instruction. It should be noted that the delaying time interval includes zero. No limit is set to a length of the time interval and the time interval may be preset or adjusted. Alternatively, the request message, which carries the identifier information of the other mobile terminal and the listen-continuing instruction, may further carry the delaying time interval or other information for determining a starting time point for transmitting the audio stream to the other mobile terminal. Further (for the convenience of differentiating between the mobile terminal and the other mobile terminal, the mobile terminal is replaced with a mobile terminal 1 for description and the other mobile terminal is replaced with a mobile terminal 2 for description hereinafter in the scenario), when text is listened to on the mobile terminal 2, the mobile terminal 1 may further request the cloud application platform to return to the mobile terminal 1 to continue to listen to or display the text, or to synchronously listen to or display the text on the mobile terminal 1 and one or more other mobile terminals (including the mobile terminal 2) at the same time. Alternatively, the mobile terminal 2 may also request the cloud application platform to transfer to the mobile terminal 1 or another mobile terminal to continue to listen to or display the text. Alternatively, the mobile terminal 2 may also request, to the cloud application platform, synchronously continuing to listen to or display the text on the mobile terminal 1 and one or more other mobile terminals (including the mobile terminal 2) at the same time.

Further, in the process for the mobile terminal to receive and play the audio stream, the user may also, by entering an instruction to the mobile terminal for continuing to read on another mobile terminal, control the mobile terminal to transfer to the another mobile terminal to continue to display the text. In one application scenario, the mobile terminal sends, when receiving the instruction for instructing to continue to read on the another mobile terminal, a request message, which carries identifier information of the another mobile terminal and a read-continuing instruction, to the cloud application platform, where the identifier information of the another mobile terminal may be, for example, an equipment identity, address, number, or IMEI number of the another mobile terminal. After receiving the request message, the cloud application platform is triggered by the read-continuing instruction to send text record information to the another mobile terminal, where the text record information includes at least one of the text to be processed, the identifier of the text to be processed, or the obtaining address of the text to be processed, and a text position mark marking a stop-processing position of the text to be processed, so that the another mobile terminal obtains, by using the text record information, the text to be processed, and locally displays text content to which the text position mark is directed. Further (for the convenience of differentiating between the mobile terminal and the another mobile terminal, the mobile terminal is replaced with a mobile terminal 1 for description and the another mobile terminal is replaced with a mobile terminal 2 for description hereinafter in the scenario), when text is displayed on the mobile terminal 2, the mobile terminal 1 may further request the cloud application platform to return to the mobile terminal 1 to continue to listen to or display text, or to synchronously listen to or display the text on the mobile terminal 1 and one or more other mobile terminals (including the mobile terminal 2) at the same time. Alternatively, the mobile terminal 2 may also request the cloud application platform to transfer to the mobile terminal 1 or another mobile terminal to continue to listen to or display the text. Alternatively, the mobile terminal 2 may also request, to the cloud application platform, synchronously continuing to listen to or display the text on the mobile terminal 1 and one or more other mobile terminals (including the mobile terminal 2) at the same time.

In an actual application, the cloud application platform automatically ends the listening procedure if the entire audio stream corresponding to the text to be listened to as requested by the mobile terminal is transmitted.

The mobile terminal in the embodiment of the present invention may be a mobile terminal that can implement text reading, such as a mobile phone, a computer, or an electronic book apparatus, and the cloud application platform in the embodiment of the present invention may be a server, where no limit is set herein.

According to the foregoing description, in the embodiment of the present invention, a cloud application platform receives a request message, which is sent by a mobile terminal and carries text information and start-processing position information; sends a response message to the mobile terminal; obtains, according to the text information, text to be processed; obtains an audio stream according to the text to be processed and the start-processing position information; and transmits the obtained audio stream to the mobile terminal, which satisfies a requirement of a user for "listening to" text on a mobile terminal.

Figure 4:
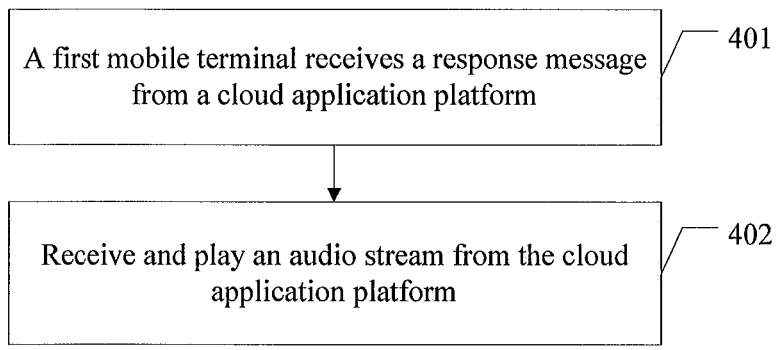
FIG. 4 is a schematic flowchart illustrating text processing performed by a mobile terminal according to another embodiment of the present invention.

In the embodiment of the present invention, one mobile terminal may also initiate a text-listening request message to a cloud application platform, to request listening to the text on another mobile terminal. The following describes a reading method for another mobile terminal (a second mobile terminal) in an embodiment of the present invention by using a first mobile terminal as a description subject. Referring to FIG. 4, the method includes:

401. A first mobile terminal receives a response message from a cloud application platform.

The response message is a response message sent by the cloud application platform to the first mobile terminal according to identifier information (for example, an identifier of the first mobile terminal, an address of the first mobile terminal, a number of the first mobile terminal, or the like) of the first mobile terminal after receiving, from a second mobile terminal, a request message, which carries text information, start-processing position information, and the identifier information of the first mobile terminal.

The text information includes at least one of an obtaining address of text to be processed, an identifier of the text to be processed, or the text to be processed, where the text to be processed is text that is required by the second mobile terminal to listen to on the first mobile terminal.

402. The first mobile terminal receives and plays an audio stream from the cloud application platform.

In the embodiment of the present invention, after the first mobile terminal receives the response message returned by the cloud application platform, the first mobile terminal may receive and play the audio stream from the cloud application platform, where the audio stream is obtained by the cloud application platform based on the information about the text to be processed and the start-processing position information after receiving the request message of the second mobile terminal, where the request message carries the text information, the start-processing position information, and the identifier information of the first mobile terminal. For example, the cloud application platform may obtain, based on the text information, the text to be processed, and perform, starting from a position of the text to be processed to which the start-processing position information is directed, TTS processing on the text to be processed, thereby obtaining the audio stream. Indeed, the cloud application platform may also reuse an audio stream that has been converted and matches the text to be processed, where no limit is set herein. A starting point of the audio stream received and played by the first mobile terminal is determined by the cloud application platform based on the start-processing position. In other words, the start-processing position information is used to determine the starting point of the audio stream. The starting point of the audio stream refers to a position on a play timeline for starting playing the audio stream.

The first mobile terminal may, by using an RTSP protocol, control the cloud application platform to transmit the audio stream to the first mobile terminal, thereby implementing receiving the audio stream in a manner of streaming media. Alternatively, the first mobile terminal may also, in an http streaming manner, control the cloud application platform to transmit the audio stream to the first mobile terminal, thereby implementing receiving the audio stream in the manner of streaming media. Indeed, the cloud application platform may also carry the audio stream in the response message, and the first mobile terminal extracts, when receiving the response message, the audio stream from the response message and plays the audio stream, where no limit is set herein.

Further, in a process for the first mobile terminal to receive and play the audio stream, a user may also, by entering an instruction to the first mobile terminal for stop listening, control the first mobile terminal to stop playing the audio stream. In one application scenario, the first mobile terminal sends, when receiving the stop-listening instruction, a stop-listening message to the cloud application platform, so that the cloud application platform stops transmitting the audio stream to the first mobile terminal.

Before or after the first mobile terminal sends the stop-listening message to the cloud application platform, the following is further included: obtaining, by the first mobile terminal, a text position mark, where the text position mark is used to indicate a stopping position, corresponding to a stopping point of the audio stream, of corresponding content in the text to be processed; and displaying text content to which the text position mark is directed, where the text position mark is used to indicate a position, corresponding to the stopping point of the audio stream, of corresponding content in the text to be processed. It should be noted that the stopping point of the audio stream involved in the embodiment of the present invention refers to a position on the play timeline for stopping playing the audio stream when the first mobile terminal receives the stop-listening instruction. In an actual application, when the first mobile terminal stops listening to the audio stream, the first mobile terminal records the stopping point of the audio stream, and obtains the text position mark according to the stopping point of the audio stream; or the first mobile terminal may also send the recorded stopping point of the audio stream to the cloud application platform, and the cloud application platform obtains the text position mark according to the stopping point of the audio stream, and the cloud application platform sends the text position mark to the first mobile terminal.

Alternatively, the first mobile terminal outputs and displays, before or after sending the stop-listening message to the cloud application platform, text content to which the text position mark is directed. Indeed, whether to display the text content to which the text position mark is directed may also be set by the user on the first mobile terminal.

Further, in the process of the first mobile terminal to receive and play the audio stream, the user may also, by entering an instruction to the first mobile terminal for continuing to listen on another mobile terminal, control the first mobile terminal to transfer to the other mobile terminal (which may be the second mobile terminal or another mobile terminal) to continue to listen to the text. In one application scenario, the first mobile terminal sends, when receiving the instruction for continuing to listen on the other mobile terminal, a request message, which carries identifier information of the other mobile terminal and a listen-continuing instruction, to the cloud application platform, where the identifier information of the other mobile terminal may be, for example, an equipment identity, address, number, or IMEI of the other mobile terminal. The cloud application platform continues, after receiving the request message, to transmit the audio stream to the other mobile terminal under the instruction of the listen-continuing instruction. A starting time point for the cloud application platform to continue to transmit the audio stream to the other mobile terminal may be determined according to the received request message, which carries the identifier information of the other mobile terminal and the listen-continuing instruction. For example, it may be set that the cloud application platform continues to transmit the audio stream to the another mobile terminal after delaying for a specific time interval upon the reception of the request message, which carries the identifier information of the other mobile terminal and the listen-continuing instruction. It should be noted that the delaying time interval includes zero. No limit is set to a length of the time interval and the time interval may be preset or adjusted. Alternatively, the request message, which carries the identifier information of the other mobile terminal and the listen-continuing instruction, may further carry the delaying time interval or other information for determining a starting time point for transmitting the audio stream to the other mobile terminal. Further, when the text is listened to on the other mobile terminal, the first mobile terminal may further request the cloud application platform to return to the first mobile terminal to continue to listen to or display the text, or to synchronously listen to or display the text on the first mobile terminal and one or more other mobile terminals (including the second mobile terminal) at the same time. Alternatively, the another mobile terminal may also request the cloud application platform to transfer to the first mobile terminal or another mobile terminal to continue to listen to or display the text. Alternatively, the another mobile terminal may also request the cloud application platform to synchronously continue to listen to or display the text on the first mobile terminal and one or more other mobile terminals (including the second mobile terminal) at the same time.

Further, in the process for the first mobile terminal to receive and play the audio stream, the user may also, by entering an instruction to the first mobile terminal for continuing to read on another mobile terminal, control the first mobile terminal to transfer to the other mobile terminal (which may be the second mobile terminal or another mobile terminal) to continue to display the text. In one application scenario, the first mobile terminal sends, when receiving the instruction for instructing to continue to read on the other mobile terminal, a request message, which carries identifier information of the other mobile terminal and a read-continuing instruction, to the cloud application platform, where the identifier information of the other mobile terminal may be, for example, an equipment identity, address, number, or IMEI number of the other mobile terminal. After receiving the request message, the cloud application platform is triggered by the read-continuing instruction to send text record information to the other mobile terminal, where the text record information includes at least one of the text to be processed, the identifier of the text to be processed, or the obtaining address of the text to be processed, and a text position mark marking a stop-processing position of the text to be processed, so that the other mobile terminal obtains, by using the text record information, the text to be processed, and locally displays text content to which the text position mark is directed. Further, when the text is displayed on the other mobile terminal, the first mobile terminal may further request the cloud application platform to return to the first mobile terminal to continue to listen to or display the text, or to synchronously listen to or display the text on the first mobile terminal and one or more other mobile terminals (including the second mobile terminal) at the same time. Alternatively, the other mobile terminal may also request the cloud application platform to transfer to the first mobile terminal or another mobile terminal to continue to listen to or display the text. Alternatively, the another mobile terminal may also request the cloud application platform to synchronously continue to listen to or display the text on the first mobile terminal and one or more other mobile terminals (including the second mobile terminal) at the same time.

In an actual application, the cloud application platform automatically ends the listening procedure if the entire audio stream corresponding to the text to be listened to as initiated by the second mobile terminal is transmitted.

The mobile terminal in the embodiment of the present invention may be a mobile terminal that can implement text reading, such as a mobile phone, a computer, or an electronic book, and the cloud application platform in the embodiment of the present invention may be a server, where no limit is set herein.

According to the foregoing description, in the embodiment of the present invention, a first mobile terminal receives a response message from a cloud application platform, and receives and plays an audio stream from the cloud application platform, where the response message is sent by the cloud application platform to the first mobile terminal according to identifier information of the first mobile terminal after receiving a request message from a second mobile terminal, where the request message carries text information, start-processing position information, and the identifier information of the first mobile terminal, which satisfies a requirement of a user for "listening to" text continuously on different mobile terminals.

Figure 5:
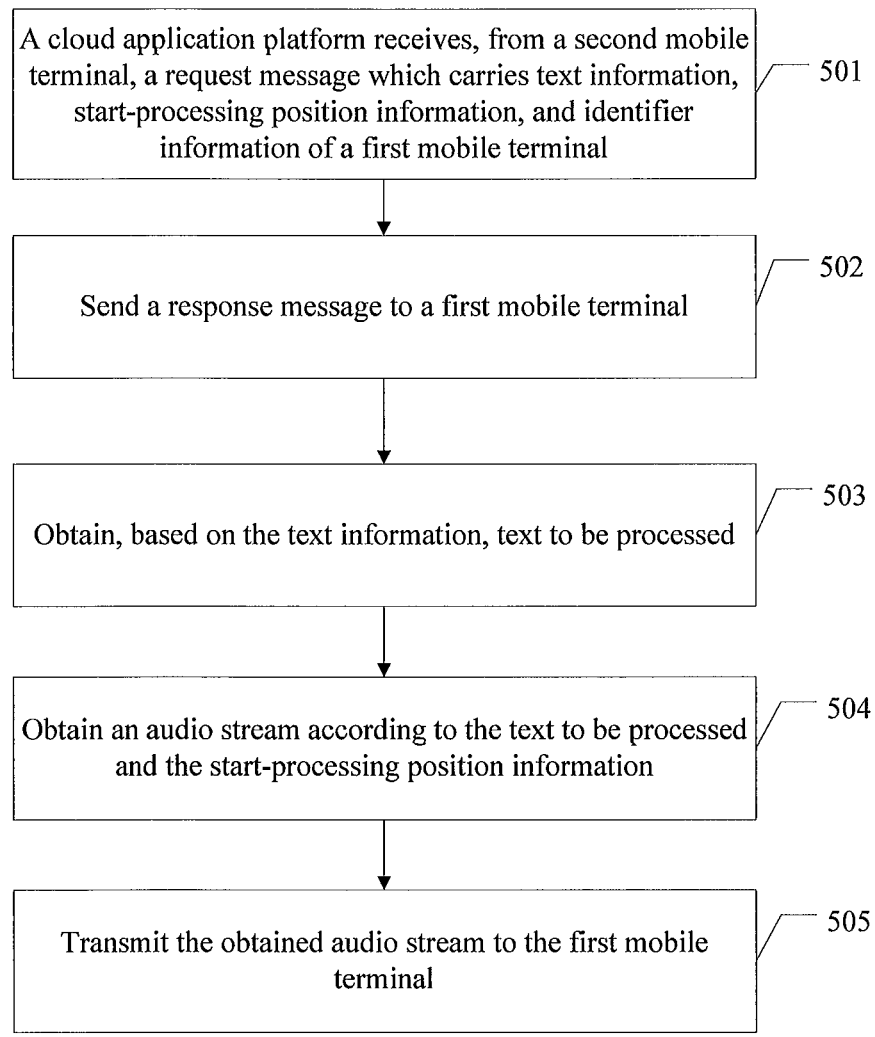
FIG. 5 is a schematic flowchart illustrating text processing performed by a mobile terminal according to another embodiment of the present invention.

The following describes a method for a mobile terminal to process text according to an embodiment of the present invention by using a cloud application platform as a description subject. Referring to FIG. 5, the method includes:

501. A cloud application platform receives, from the second mobile terminal, a request message, which carries text information, start-processing position information, and identifier information of a first mobile terminal.

In the embodiment of the present invention, the request message may be an HTTP request message (for example, an HTTP POST message). Alternatively, the cloud application platform may also allocate a specific URL to the mobile terminal for providing a reading-to-listening service; accordingly, the request message may be a message directed to the URL so that the cloud application platform learns that the mobile terminal is to trigger the reading-to-listening service.

The text information includes at least one of or any combination of text to be processed, an obtaining address of the text to be processed, and an identifier of the text to be processed, where the text to be processed refers to the text requested by the second mobile terminal to listen to.

It should be noted that the text to be processed includes but is not limited to a document, content or an image on a webpage on the mobile terminal, or the like.

The identifier information of the first mobile terminal may be, for example, an identifier, address, or number of the first mobile terminal.

502. The cloud application platform sends a response message to the first mobile terminal.

The cloud application platform learns, after receiving the request message, that the second mobile terminal is to trigger a reading-to-listening service on the first mobile terminal, and sends the response message to the first mobile terminal according to the identifier information of the first mobile terminal, so that the first mobile terminal gets prepared to receive an audio stream.

503. The cloud application platform obtains, based on the text information, the text to be processed.

For example, if the text information includes at least one of the obtaining address of the text to be processed and the identifier of the text to be processed, the cloud application platform may obtain, according to the obtaining address and/or identifier, which is carried in the text information, of the text to be processed, the text to be processed from a local database or another network device. Normally, the cloud application platform obtains full text according to the obtaining address and/or identifier of the text; however, it is possible that the mobile terminal does not need to start listening from the beginning of the full text. In the embodiment of the present invention, the cloud application platform may, after obtaining the text to be processed, learn, according to the start-processing position information, a position of the text to be processed for starting processing. The start-processing position may be, for example, one paragraph of the text to be processed, or one sentence or several sentences of one paragraph of the text to be processed, where no limit is set herein.

For another example, if the text information includes the text to be processed, the cloud application platform may directly obtain the text to be processed from the information about the text to be processed.

504. The cloud application platform obtains an audio stream according to the text to be processed and the start-processing position information.

In the embodiment of the present invention, the cloud application platform starts, after obtaining the text to be processed, performing TTS processing on the text to be processed, thereby obtaining an audio stream, where the start-processing position information is used to determine a starting point of the audio stream. The starting point of the audio stream refers to a position on a play timeline for starting playing the audio stream.

In order to save resources and relieve a TTS processing load, the cloud application platform may store the audio stream obtained by performing TTS processing, and create a mapping relationship between an audio time point of the audio stream and a text position, so that the cloud application platform may reuse content obtained by performing TTS processing before.

505. The cloud application platform transmits the obtained audio stream to the first mobile terminal.

In the embodiment of the present invention, the cloud application platform may transmit the audio stream to the first mobile terminal based on an RTSP protocol, or the cloud application platform may also transmit the audio stream to the first mobile terminal in an http streaming manner. Indeed, the cloud application platform may also carry the audio stream in the response message, and the first mobile terminal extracts, when receiving the response message, the audio stream from the response message and plays the audio stream, where no limit is set herein.

Further, the obtaining an audio stream according to the text to be processed and the start-processing position information includes:

determining a start-processing position according to the start-processing position information, performing text-to-speech conversion on text content, starting from the start-processing position, of the text to be processed, and obtaining an audio stream corresponding to the text content, starting from the start-processing position, of the text to be processed.

Further, in a process for the first mobile terminal to receive and play the audio stream, a user may also, by entering an instruction to the first mobile terminal for stop listening, control the first mobile terminal to stop playing the audio stream. In one application scenario, the first mobile terminal sends, when receiving the stop-listening instruction, a stop-listening message to the cloud application platform, so that the cloud application platform stops transmitting the audio stream to the first mobile terminal after receiving the stop-listening message. Further, the stop-listening message received by the cloud application platform may carry a text position mark, where the text position mark is used to indicate a stopping position, corresponding to the stopping point of the audio stream, of corresponding content in the text to be processed. Alternatively, the cloud application platform may record the text position mark.

Further, in the process of the first mobile terminal to receive and play the audio stream, the user may also, by entering an instruction to the first mobile terminal for continuing to listen on another mobile terminal, control the first mobile terminal to transfer to the other mobile terminal (which may be the second mobile terminal or another mobile terminal) to continue to listen to the text. In one application scenario, the first mobile terminal sends, when receiving the instruction for continuing to listen on the other mobile terminal, a request message, which carries identifier information of the another mobile terminal and a listen-continuing instruction, to the cloud application platform, where the identifier information of the another mobile terminal may be, for example, an equipment identity, address, number, or IMEI of the other mobile terminal. The cloud application platform continues, after receiving the request message, to transmit the audio stream to the other mobile terminal under the instruction of the listen-continuing instruction. A starting time point for the cloud application platform to continue to transmit the audio stream to the other mobile terminal may be determined according to the received request message, which carries the identifier information of the another mobile terminal and the listen-continuing instruction. For example, it may be set that the cloud application platform continues to transmit the audio stream to the other mobile terminal after delaying for a specific time interval upon the reception of the request message, which carries the identifier information of the another mobile terminal and the listen-continuing instruction. It should be noted that the delaying time interval includes zero. No limit is set to a length of the time interval and the time interval may be preset or adjusted. Alternatively, the request message, which carries the identifier information of the other mobile terminal and the listen-continuing instruction, may further carry the delaying time interval or other information for determining a starting time point for transmitting the audio stream to the another mobile terminal. Further, when the text is listened to on the another mobile terminal, the first mobile terminal may further request the cloud application platform to return to the first mobile terminal to continue to listen to or display the text, or to synchronously listen to or display the text on the first mobile terminal and one or more other mobile terminals (including the another mobile terminal) at the same time. Alternatively, the another mobile terminal may also request the cloud application platform to transfer to the first mobile terminal or another mobile terminal to continue to listen to or display the text. Alternatively, the another mobile terminal may also request the cloud application platform to synchronously continue to listen to or display the text on the first mobile terminal and one or more other mobile terminals (including the another mobile terminal) at the same time.

Further, in the process for the first mobile terminal to receive and play the audio stream, the user may also, by entering an instruction to the first mobile terminal for continuing to read on another mobile terminal, control the first mobile terminal to transfer to the other mobile terminal (which may be the second mobile terminal or other mobile terminal) to continue to display the text. In one application scenario, the first mobile terminal sends, when receiving the instruction for instructing to continue to read on the other mobile terminal, a request message, which carries identifier information of the other mobile terminal and a read-continuing instruction, to the cloud application platform, where the identifier information of the other mobile terminal may be, for example, an equipment identity, address, number, or IMEI number of the another mobile terminal. After receiving the request message, the cloud application platform is triggered by the read-continuing instruction to send text record information to the another mobile terminal, where the text record information includes at least one of the text to be processed, the identifier of the text to be processed, or the obtaining address of the text to be processed, and a text position mark marking a stop-processing position of the text to be processed, so that the other mobile terminal obtains, by using the text record information, the text to be processed, so that the another mobile terminal obtains, by using the text record information, the text to be processed, and locally displays text content to which the text position mark is directed. Further, when the text is displayed on the other mobile terminal, the first mobile terminal may further request the cloud application platform to return to the first mobile terminal to continue to listen to or display the text, or to synchronously listen to or display the text on the first mobile terminal and one or more other mobile terminals (including the another mobile terminal) at the same time. Alternatively, the other mobile terminal may also request the cloud application platform to transfer to the first mobile terminal or another mobile terminal to continue to listen to or display the text. Alternatively, the other mobile terminal may also request the cloud application platform to synchronously continue to listen to or display the text on the first mobile terminal and one or more other mobile terminals (including the another mobile terminal) at the same time.

In an actual application, the cloud application platform automatically ends the listening procedure if the entire audio stream corresponding to the text to be listened to as initiated by the second mobile terminal is transmitted.

According to the foregoing description, in the embodiment of the present invention, a second mobile terminal sends a request message, which carries text information, start-processing position information, and identifier information of a first mobile terminal, to a cloud application platform, and the cloud application platform sends a response message to the first mobile terminal, the cloud application platform obtains, based on the text information, text to be processed, the cloud application platform obtains an audio stream according to the text to be processed and the start-processing position information, and transmits the obtained audio stream to the first mobile terminal, so that the first mobile terminal may receive and play the audio stream, which satisfies a requirement of a user for "listening to" text continuously on different mobile terminals.

Figure 6:
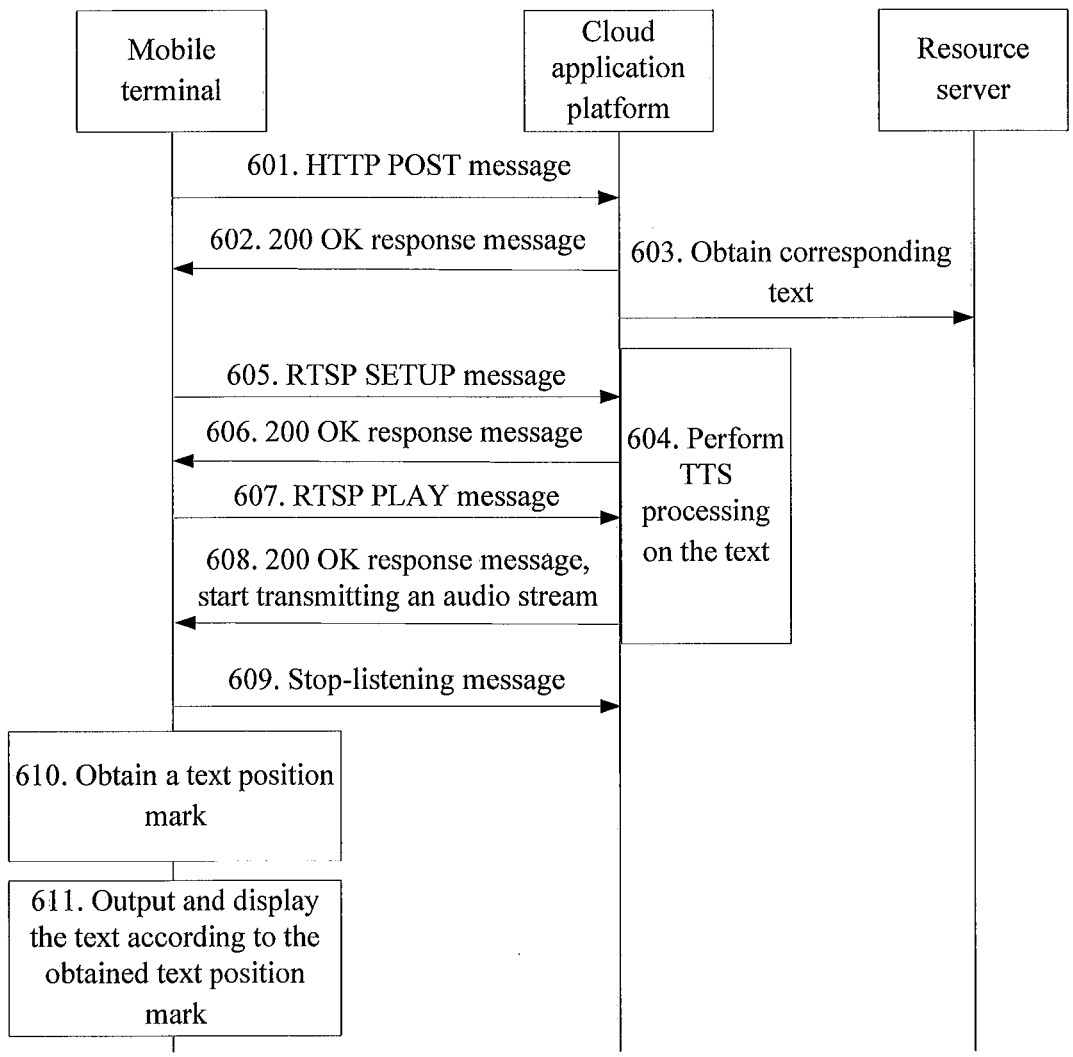
FIG. 6 is a schematic flowchart illustrating text processing performed by a mobile terminal according to another embodiment of the present invention.

The following uses an example of a procedure of interaction between a mobile terminal and a cloud application platform to describe a method for a mobile terminal to process text according to an embodiment of the present invention by using a specific application scenario. Referring to FIG. 6, the method includes:

601: A mobile terminal sends an HTTP POST message to a cloud application platform, where the HTTP POST message carries an obtaining address and start-processing position information of text that is requested to be listened to.

602. The cloud application platform returns a 200 OK response message to the mobile terminal, so that the mobile terminal learns that the cloud application platform has received the HTTP POST message.

603. The cloud application platform obtains corresponding text from a resource server according to the obtaining address of the text in the HTTP POST message.

604. The cloud application platform performs TTS processing on the text starting from a position indicated by the start-processing position information, thereby converting text content into an audio stream.

In the embodiment of the present invention, depending on a resource situation of the cloud application platform, an upper limit may be set for a size of the audio stream cached by the cloud application platform before receiving a "RTSP PLAY" command.

605. The mobile terminal sends an RTSP SETUP message to the cloud application platform to request setting up a streaming media session.

606. The cloud application platform returns a 200 OK response to the mobile terminal to complete the setup of the streaming media session.

607. The mobile terminal sends an RTSP PLAY message to the cloud application platform to request receiving and playing the audio stream.

608. The cloud application platform returns a 200 OK response to the mobile terminal to start transmitting the audio stream to the mobile terminal.

609. The mobile terminal sends a stop-listening message to the cloud application platform.

A user may trigger, after step 608 is performed, the mobile terminal to send the stop-listening message to the cloud application platform, thereby stopping receiving and playing the audio stream.

610. The mobile terminal obtains a text position mark.

When the mobile terminal stops listening to the audio stream, the mobile terminal records a stopping point of the audio stream, and obtains the text position mark according to the stopping point of the audio stream, where the text position mark is used to indicate a stopping position, corresponding to the stopping point of the audio stream, of corresponding content in the text to be processed.

611. The mobile terminal displays the text according to the obtained text position mark.

In the embodiment of the present invention, the mobile terminal displays, after obtaining the text position mark, the text content to which the position mark of the text to be processed is directed. Indeed, in another application scenario, the mobile terminal may not display the text, which may be set by the user on the mobile terminal.

It should be noted that in an actual procedure, it is also possible that there is no step 609. Accordingly, after step 608, after the entire text requested by the mobile terminal to listen to is played, that is, after the entire audio stream of the text to be processed is received, the procedure is ended automatically. The process of TTS processing that is triggered by step 604 lasts until step 609, or ends after TTS processing on all text content is completed. In the embodiment of the present invention, the HTTP POST message in step 601 may also carry a text identifier, where the identifier of the text to be processed is agreed upon between the mobile terminal and the cloud application platform, and can be uniquely directed to one text. Indeed, in the embodiment of the present invention, the HTTP POST message in step 601 may also directly carry text; accordingly, step 603 may be replaced with obtaining text from the HTTP POST message, and step 604 may be replaced with performing, by the cloud application platform, TTS processing on the text starting from the first letter of the text to be processed.

Figure 7:
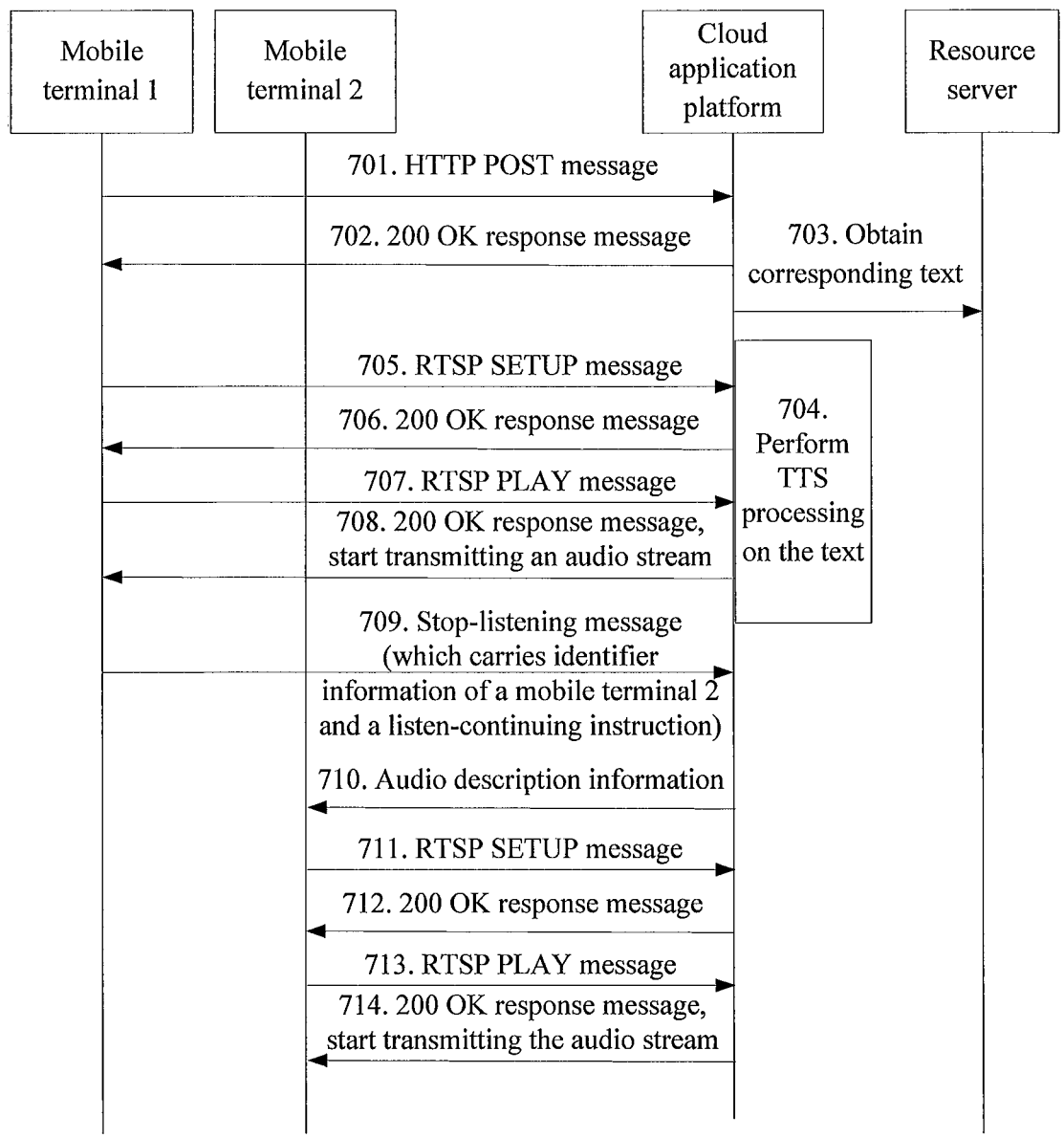
FIG. 7 is a schematic flowchart illustrating text processing performed by a mobile terminal according to another embodiment of the present invention.

The following uses an example of a procedure of interaction between a mobile terminal and a cloud application platform to describe a method for a mobile terminal to process text according to an embodiment of the present invention by using another specific application scenario. Referring to FIG. 7, the method includes:

Steps 701 to 708 may be similar to steps 601 to 608 in FIG. 6, the mobile terminal in steps 601 to 608 in FIG. 6 is replaced with a mobile terminal 1 herein, and the description of steps 601 to 608 in FIG. 6 may be referenced to for other description, which is not described herein again.

709. A mobile terminal 1 sends a stop-listening message to a cloud application platform, where the stop-listening message carries identifier information of a mobile terminal 2 and a listen-continuing instruction.

After step 708 is performed, a user may trigger the mobile terminal 1 to request, to the cloud application platform, continuing to listen to the text on the mobile terminal 2; therefore, the mobile terminal 1 sends the stop-listening message to the cloud application platform and carries the identifier information of the mobile terminal 2 and the listen-continuing instruction in the stop-listening message.

710. The cloud application platform pushes audio description information to the mobile terminal 2, so that the mobile terminal 2 learns information about an audio stream to be received and get prepared for receiving.

Steps 711 to 714 may be similar to steps 605 to 608 in FIG. 6, the mobile terminal in steps 605 to 608 in FIG. 6 is replaced with a mobile terminal 2 herein, and the description of steps 605 to 608 in FIG. 6 may be referenced to for other description, which is not described herein again.

The embodiment of the present invention implements transferring from one mobile terminal to another mobile terminal to continue to listen. In the embodiment of the present invention, step 709 may also be replaced with "sending, by the mobile terminal 1, a stop-listening message to the cloud application platform, where the stop-listening message carries the identifier information of the mobile terminal 2 and a read-continuing instruction". Accordingly, steps 710 to 714 are replaced with "sending, by the cloud application platform, the text or an obtaining address of the text, and text record information that indicates a text position mark of a stop-processing position of the text to the mobile terminal 2; and outputting and displaying, by the mobile terminal 2, the text according to the received text record information", thereby implementing transferring from one mobile terminal to another mobile terminal to continue to process the text.

In the embodiment of the present invention, the mobile terminal 2 may control and initiate interaction with the cloud application platform, and it may be specified that content is listened to on the mobile terminal 1. That is, step 701 in FIG. 7 is replaced with "sending, by the mobile terminal 2, an HTTP POST message to the cloud application platform, where the HTTP POST message carries an obtaining address of the text requested to listen to, a starting position mark, and identifier information of the mobile terminal 1", and the other steps are similar to steps 702 to 714 in FIG. 7.

In the embodiment of the present invention, in a process of continuing to listen to the text (or to process the text) on the mobile terminal 2, the mobile terminal 1 or the mobile terminal 2 may initiate, to the cloud application platform, continuing to listen to the text (or to process the text) on the mobile terminal 1 or another mobile terminal other than the mobile terminal 1 and the mobile terminal 2; and when the cloud application platform may also, when transferring to another mobile terminal other than a current mobile terminal to continue to listen to or read the text, obtain a listening position or a reading position of the current text from the current mobile terminal, to continue to listen to or read the text starting from the listening position or the reading position on the target mobile terminal.

Figure 8:
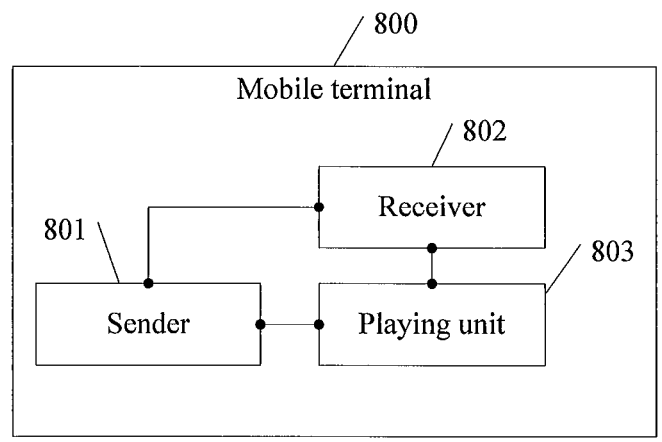
FIG. 8 is a structural diagram of a mobile terminal according to an embodiment of the present invention.

The following describes a mobile terminal according to an embodiment of the present invention. Referring to FIG. 8, a mobile terminal 800 according to the embodiment of the present invention includes:

a sender 801, configured to send a request message, which carries text information and start-processing position information, to a cloud application platform, so that the cloud application platform obtains, according to the text information, text to be processed, where the text information includes at least one of or any combination of the text to be processed, an obtaining address of the text to be processed, and an identifier of the text to be processed;

a receiver 802, configured to receive a response message, which is returned by the cloud application platform, of the request message; and a playing unit 803, configured to receive and play, when the receiver 802 receives the response message returned by the cloud application platform, an audio stream from the cloud application platform, where the audio stream is obtained by the cloud application platform according to the text to be processed and the start-processing position information, and a starting point of the audio stream is determined by the cloud application platform based on the start-processing position information. In other words, the start-processing position information is used to determine the starting point of the audio stream.

In one application scenario of the present invention, the receiver 802 is further configured to receive a stop-listening instruction; and the sender 801 is further configured to send, when the receiver 802 receives the stop-listening instruction, a stop-listening message to the cloud application platform, so that the cloud application platform stops transmitting the audio stream to the mobile terminal 800.

Further, the mobile terminal 800 further includes: an obtaining unit, where the obtaining unit is configured to obtain a text position mark, where the text position mark is used to indicate a position, corresponding to a stopping point of the audio stream, of corresponding content in the text to be processed, and the stopping point of the audio stream refers to a position on a play timeline for stopping playing the audio stream when the cloud application platform stops transmitting the audio stream to the mobile terminal 800. The mobile terminal 800 further includes a displaying unit, configured to display text content which is obtained by the obtaining unit and to which the text position mark is directed.

In another application scenario of the present invention, the receiver 802 is further configured to receive an instruction for continuing to listen on another mobile terminal; and the sender 801 is further configured to send, when the receiver 802 receives the instruction for continuing to listen on another mobile terminal, a request message, which carries identifier information of the another mobile terminal and a listen-continuing instruction, to the cloud application platform, so that the cloud application platform continues to transmit the audio stream to the other mobile terminal.

In another application scenario of the present invention, the receiver 802 is further configured to receive an instruction entered by a user for instructing to continue to read on another mobile terminal; and the sender 801 is further configured to send, when the receiver 802 receives the instruction for continuing to read on another mobile terminal, a request message, which carries identifier information of the another mobile terminal and a read-continuing instruction, to the cloud application platform, so that the cloud application platform sends text record information to the other mobile terminal, so that the other mobile terminal obtains, by using the text record information, the text to be processed, and displays text content to which a text position mark included in the text record information is directed, where the text record information further includes at least one of the text to be processed, the identifier of the text to be processed, or the obtaining address of the text to be processed, and the text position mark is used to indicate a stop-processing position of the text to be processed.

It should be noted that the mobile terminal 800 in the embodiment of the present invention may be the mobile terminal in the foregoing method embodiments, and may be used to implement all the technical solutions in the foregoing method embodiments, functions of functional modules thereof may be specifically implemented according to the methods in the foregoing method embodiments, and reference may be made to relevant description in the foregoing embodiments for specific implementation processes thereof, which are not described herein again.

According to the foregoing description, in the embodiment of the present invention, a mobile terminal sends a request message to a cloud application platform, and notifies, in the request message, the cloud application platform of text to be listened to; and the cloud application platform obtains, after receiving the request message of the mobile terminal, an audio stream corresponding to the text to be listened to by the mobile terminal, and transmits the audio stream to the mobile terminal, so that the mobile terminal may receive and play the audio stream, thereby satisfying a requirement of a user for "listening to" text on a mobile terminal.

Figure 9:
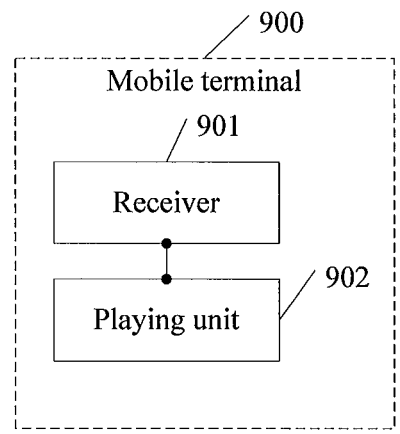
FIG. 9 is a structural diagram of another mobile terminal according to an embodiment of the present invention.

The following describes another mobile terminal according to an embodiment of the present invention. Referring to FIG. 9, a mobile terminal 900 according to the embodiment of the present invention includes:

a receiver 901, configured to receive a response message from a cloud application platform, where the response message is sent by the cloud application platform to a first mobile terminal according to identifier information of the first mobile terminal after receiving a request message, which carries text information, start-processing position information, and the identifier information of the first mobile terminal, from a second mobile terminal, where the text information includes at least one of or any combination of text to be processed, an obtaining address of the text to be processed, and an identifier of the text to be processed; and a playing unit 902, configured to receive and play an audio stream from the cloud application platform, where the audio stream is obtained by the cloud application platform according to the text to be processed and the start-processing position information, the text to be processed is obtained by the cloud application platform according to the text information, and the start-processing position information is used to determine a starting point of the audio stream. The starting point of the audio stream refers to a position on a play timeline for starting playing the audio stream.

In one application scenario, the receiver 901 is further configured to receive a stop-listening instruction entered by a user, and the mobile terminal 900 further includes: a sender, configured to send, when the receiver 901 receives the stop-listening instruction entered by the user, a stop-listening message to the cloud application platform, so that the cloud application platform stops transmitting the audio stream to the mobile terminal 900.

Further, the mobile terminal 900 further includes: an obtaining unit, where the obtaining unit is configured to obtain a text position mark, where the text position mark is used to indicate a position, corresponding to a stopping point of the audio stream, of corresponding content in the text to be processed, and the stopping point of the audio stream refers to a position on the play timeline for stopping playing the audio stream when the cloud application platform stops transmitting the audio stream to the mobile terminal 900. The mobile terminal 900 further includes: a displaying unit, configured to display, when the obtaining unit obtains listening record information, text content to which the text position mark is directed.

In another application scenario, the receiver 901 is further configured to receive an instruction entered by the user for continuing to listen on another mobile terminal, and the mobile terminal 900 further includes: a sender, configured to send, when the receiver 901 receives the instruction entered by the user for continuing to listen on another mobile terminal, a request message, which carries identifier information of the other mobile terminal and a listen-continuing instruction, to the cloud application platform, so that the cloud application platform continues to transmit the audio stream to the other mobile terminal.

In another application scenario, the receiver 901 is further configured to receive an instruction entered by the user for continuing to read on another mobile terminal, and the mobile terminal 900 further includes: a sender, configured to send, when the receiver 901 receives the instruction for continuing to read on another mobile terminal, a request message, which carries identifier information of e another mobile terminal and a read-continuing instruction, to the cloud application platform, so that the cloud application platform sends text record information to the other mobile terminal, so that the other mobile terminal obtains, by using the text record information, the text to be processed, and displays text content to which a text position mark included in the text record information is directed, where the text record information further includes at least one of the text to be processed, the identifier of the text to be processed, or the obtaining address of the text to be processed, and the text position mark is used to indicate a stop-processing position of the text to be processed.

It should be noted that, the mobile terminal 900 in the embodiment of the present invention may satisfy any two application scenarios of the foregoing three application scenarios, or may satisfy the foregoing three application scenarios. If the mobile terminal 900 in the embodiment of the present invention satisfies any two application scenarios of the foregoing three application scenarios or satisfies the foregoing three application scenarios, a function implemented by senders described in the any two application scenarios or the foregoing three application scenarios may be implemented by a same sender.

It should be noted that the mobile terminal 900 in the embodiment of the present invention may be the first mobile terminal in the foregoing method embodiments, and may be used to implement all the technical solutions in the foregoing method embodiments, functions of functional modules thereof may be specifically implemented according to the methods in the foregoing method embodiments, and reference may be made to relevant description in the foregoing embodiments for specific implementation processes thereof, which are not described herein again.

According to the foregoing description, in the embodiments of the present invention, a second mobile terminal sends a request message to a cloud application platform, and notify, in the request message, the cloud application platform of identifier information of a first mobile terminal and text to be listened to; and the cloud application platform obtains, after receiving the request message of the second mobile terminal, an audio stream corresponding to the relevant text, and transmit the audio stream to the first mobile terminal, so that the first mobile terminal may receive and play the audio stream, thereby satisfying a requirement of a user for "listening to" the text on a mobile terminal.

Figure 10:
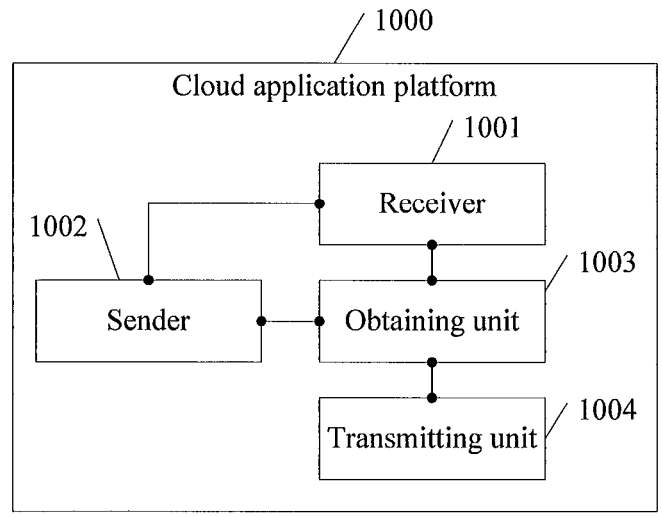
FIG. 10 is a structural diagram of a cloud application platform according to an embodiment of the present invention.

The following describes a cloud application platform according to an embodiment of the present invention. Referring to FIG. 10, a cloud application platform 1000 according to the embodiment of the present invention includes:

a receiver 1001, configured to receive a request message, which is sent by a mobile terminal and carries text information and start-processing position information, where the text information includes at least one of or any combination of text to be processed, an obtaining address of the text to be processed, and an identifier of the text to be processed;

a sender 1002, configured to send a response message to the mobile terminal when the receiver 1001 receives the request message, so that the mobile terminal learns that the cloud application platform successfully receives the request message;

an obtaining unit 1003, configured to obtain, according to the text information, the text to be processed, and obtain an audio stream according to the text to be processed and the start-processing position information, where the start-processing position information is used to determine a starting point of the audio stream; and a transmitting unit 1004, configured to transmit the audio stream obtained by the obtaining unit 1003 to the mobile terminal.

In one application scenario of the present invention, the receiver 1001 is further configured to receive a stop-listening message sent by the mobile terminal; and the transmitting unit 1004 stops transmitting the audio stream to the mobile terminal when the receiver 1001 receives the stop-listening message.

In another application scenario of the present invention, the receiver 1001 is further configured to receive a request message, which is sent by the mobile terminal and carries identifier information of another mobile terminal and a listen-continuing instruction; and the transmitting unit 1004 is further configured to continue, when the receiver 1001 receives the request message, which carries the identifier information of the another mobile terminal and the listen-continuing instruction, to send the audio stream to the another mobile terminal.

In still another application scenario of the present invention, the receiver 1001 is further configured to receive a request message, which is sent by the mobile terminal and carries identifier information of another mobile terminal and a read-continuing instruction; and the sender 1002 is further configured to send, when the receiver 1001 receives the request message, which carries the identifier information of the another mobile terminal and the read-continuing instruction, text record information to the another mobile terminal, so that the another mobile terminal obtains, by using the text record information, the text to be processed, and displays text content to which a text position mark included in the text record information is directed, where the text record information further includes at least one of the text to be processed, the identifier of the text to be processed, or the obtaining address of the text to be processed, and the text position mark is used to indicate a stop-processing position of the text to be processed.

It should be noted that the cloud application platform 1000 in the embodiment of the present invention may be the cloud application platform in the foregoing method embodiments, and may be used to implement all the technical solutions in the foregoing method embodiments, functions of functional modules thereof may be specifically implemented according to the methods in the foregoing method embodiments, and reference may be made to relevant description in the foregoing embodiments for specific implementation processes thereof, which are not described herein again.

According to the foregoing description, in the embodiment of the present invention, a mobile terminal sends a request message to a cloud application platform, and notifies, in the request message, the cloud application platform of text to be listened to; and the cloud application platform obtains, after receiving the request message of the mobile terminal, an audio stream corresponding to the text to be listened to by the mobile terminal, and transmits the audio stream to the mobile terminal, so that the mobile terminal receives and plays the audio stream, thereby satisfying a requirement of a user for "listening to" text on a mobile terminal.

Figure 11:
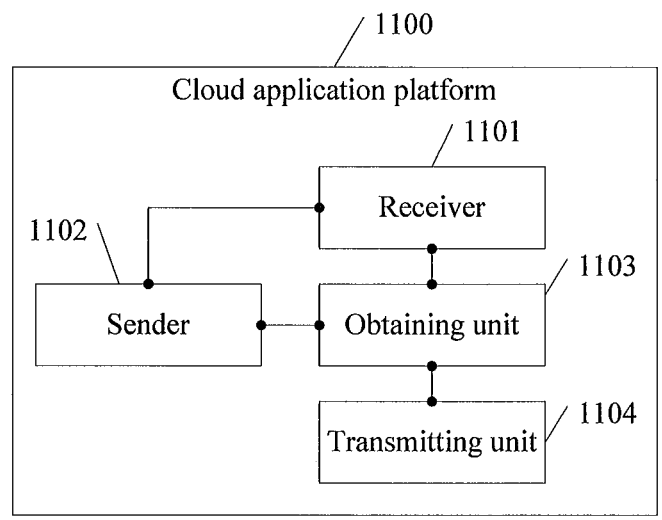
FIG. 11 is a structural diagram of another cloud application platform according to an embodiment of the present invention.

The following describes another cloud application platform according to an embodiment of the present invention. Referring to FIG. 11, a cloud application platform 1100 according to the embodiment of the present invention includes:

a receiver 1101, configured to receive, from a second mobile terminal, a request message, which carries text information, start-processing position information, and identifier information of a first mobile terminal, where the text information includes at least one of or any combination of text to be processed, an obtaining address of the text to be processed, and an identifier of the text to be processed;

a sender 1102, configured to send, when the receiver 1101 receives the request message, a response message to the first mobile terminal according to the identifier information of the first mobile terminal;

an obtaining unit 1103, configured to obtain, based on the text information, the text to be processed, and obtain an audio stream according to the text to be processed and the start-processing position information, where the start-processing position information is used to determine a starting point of the audio stream; and a transmitting unit 1104, configured to transmit the audio stream obtained by the obtaining unit 1103 to the first mobile terminal.

In one application scenario, the receiver 1101 is further configured to receive a stop-listening message sent by the first mobile terminal; and the transmitting unit 1104 is further configured to stop, when the receiver 1101 receives the stop-listening message, transmitting the audio stream to the first mobile terminal.

In another application scenario, the receiver 1101 is further configured to receive a stop-listening message, which is sent by the first mobile terminal and carries identifier information of another mobile terminal and a listen-continuing instruction; and the transmitting unit 1104 is further configured to continues, when the receiver 1101 receives the stop-listening message, to transmit the audio stream to the another mobile terminal.

In another application scenario, the receiver 1101 is further configured to receive a stop-listening message, which is sent by the first mobile terminal and carries identifier information of another mobile terminal and a read-continuing instruction; and the sender 1102 is further configured to send, when the receiver 1101 receives the stop-listening message, text record information to the another mobile terminal, so that the another mobile terminal obtains, by using the text record information, the text to be processed, and displays text content to which a text position mark included in the text record information is directed, where the text record information further includes at least one of the text to be processed, the identifier of the text to be processed, or the obtaining address of the text to be processed, and the text position mark is used to indicate a stop-processing position of the text to be processed.

It should be noted that the cloud application platform 1100 in the embodiment of the present invention may be the cloud application platform in the foregoing method embodiments, and may be used to implement all the technical solutions in the foregoing method embodiments, functions of functional modules thereof may be specifically implemented according to the methods in the foregoing method embodiments, and reference may be made to relevant description in the foregoing embodiments for specific implementation processes thereof, which are not described herein again.

According to the foregoing description, in the embodiment of the present invention, a second mobile terminal sends a request message to a cloud application platform, and notifies, in the request message, the cloud application platform of identifier information of a first mobile terminal and text to be listened to; and the cloud application platform obtains, after receiving the request message of the second mobile terminal, an audio stream corresponding to the relevant text, and transmits the audio stream to the mobile terminal, so that the mobile terminal receives and plays the audio stream, thereby satisfying a requirement of a user for "listening to" text on a mobile terminal.

Figure 12:
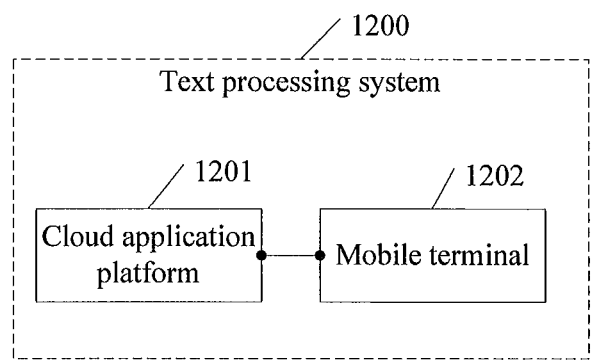
FIG. 12 is a structural diagram of a text processing system according to an embodiment of the present invention.

The following describes text processing system according to an embodiment of the present invention. Referring to FIG. 12, a text processing system 1200 according to the embodiment of the present invention includes:

a cloud application platform 1201 and a mobile terminal 1202, where:

the cloud application platform 1201 is configured to: receive a request message, which is sent by the mobile terminal 1202 and carries text information and start-processing position information, where the text information includes at least one of or any combination of text to be processed, an obtaining address of the text to be processed, and an identifier of the text to be processed; send a response message to the mobile terminal 1202; obtain, according to the text information, the text to be processed; obtain an audio stream according to the text to be processed and the start-processing position information, where a starting point of the audio stream is determined by the cloud application platform 1201 based on the start-processing position information; and transmit the audio stream to the mobile terminal 1202; and the mobile terminal 1202 is configured to: send the request message, which carries the text information and the start-processing position information, to the cloud application platform 1201; and when or after receiving the response message, which is returned by the cloud application platform 1201, of the request message, receive and play the audio stream from the cloud application platform 1201.

It should be noted that the cloud application platform 1201 in the embodiment of the present invention may be the cloud application platform in the foregoing method embodiments, the mobile terminal 1202 in the embodiment of the present invention may be the mobile terminal in the foregoing method embodiments, which may be used to implement all the technical solutions in the method embodiments. A function of functional modules thereof may be specifically implemented according to the methods in the method embodiments, and reference may be made to relevant description in the foregoing embodiments for specific implementation processes thereof, which are not described herein again.

According to the foregoing description, in the embodiment of the present invention, a mobile terminal sends a request message to a cloud application platform, and notifies, in the request message, the cloud application platform of text to be listened to; and the cloud application platform obtains, after receiving the text-listening request of the mobile terminal, an audio stream corresponding to the text to be listened to by the mobile terminal, and transmits the audio stream to the mobile terminal, so that the mobile terminal may receive and play the audio stream, thereby satisfying a requirement of a user for "listening to" text on a mobile terminal.

Figure 13:
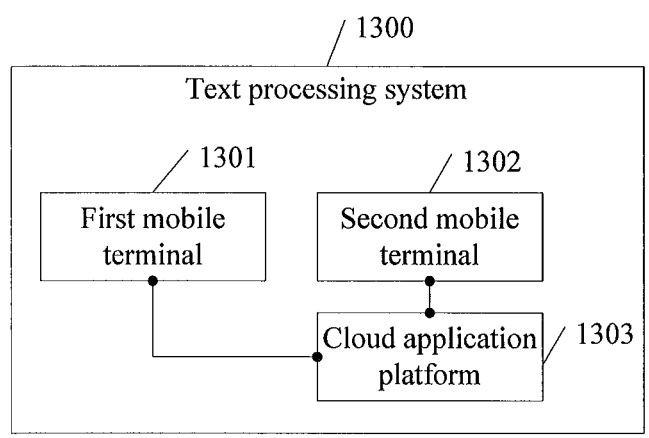
FIG. 13 is a structural diagram of another text processing system according to an embodiment of the present invention.

The following describes another text processing system according to an embodiment of the present invention. Referring to FIG. 13, a text processing system 1300 according to the embodiment of the present invention includes:

a first mobile terminal 1301, a second mobile terminal 1302, and a cloud application platform 1303; where the second mobile terminal 1302 is configured to send a request message, which carries text information, start-processing position information, and identifier information of the first mobile terminal 1301, to the cloud application platform 1303, where the text information includes at least one of or any combination of text to be processed, an obtaining address of the text to be processed, and an identifier of the text to be processed;

the cloud application platform 1303 is configured to: receive, from the second mobile terminal 1302, the request message, which carries the text information, the start-processing position information, and the identifier information of the first mobile terminal 1301; send a response message to the first mobile terminal 1301 according to the identifier information of the first mobile terminal 1301; obtain, based on the text information, the text to be processed; and obtain an audio stream according to the text to be processed and the start-processing position information, where a starting point of the audio stream is determined by the cloud application platform 1303 based on the start-processing position information; that is, the start-processing position information is used to determine the starting point of the audio stream; and the first mobile terminal 1301 is configured to: receive the response message from the cloud application platform 1303; and receive and play the audio stream from the cloud application platform 1303.

It should be noted that the first mobile terminal 1301 in the embodiment of the present invention may be the first mobile terminal in the foregoing method embodiments, the second mobile terminal 1303 in the embodiment of the present invention may be the second mobile terminal in the foregoing method embodiments, and the cloud application platform 1303 in the embodiment of the present invention may be the cloud application platform in the foregoing method embodiments, which may be used to implement all the technical solutions of the foregoing method embodiments. A function of functional modules thereof may be specifically implemented according to the methods in the foregoing method embodiments, and reference may be made to relevant description in the foregoing embodiments for specific implementation processes thereof, which are not described herein again.

According to the foregoing description, in the embodiment of the present invention, a second mobile terminal sends a request message to a cloud application platform, and notify, in the request message, the cloud application platform of identifier information of a first mobile terminal and text to be listened to; and the cloud application platform obtains, after receiving the request message of the second mobile terminal, an audio stream corresponding to the relevant text, and transmit the audio stream to the first mobile terminal, so that the first mobile terminal may receive and play the audio stream, thereby satisfying a requirement of a user for "listening to" text on different mobile terminals.

It may be clearly understood by a person skilled in the art that, for the purpose of convenient and brief description, for a detailed working process of the foregoing apparatus and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

A method for a mobile terminal to process text, a related device, and a system provided in the embodiments of the present invention are described in detail above. Persons of ordinary skill in the art may, based on the idea of the embodiments of the present invention, make modifications and variations with respect to the implementation manners and the application scope of the present invention. Therefore, the specification shall not be construed as a limitation on the present invention.

What is claimed is:

1. A method for a mobile terminal to process text, the method comprising:
sending a request message, which carries text information and start-processing position information, to a cloud application platform, so that the cloud application platform obtains, according to the text information, text to be processed, wherein the text information comprises at least one of or any combination of the text to be processed, an obtaining address of the text to be processed, and an identifier of the text to be processed; and
when or after obtaining a response message, which is returned by the cloud application platform, of the request message, receiving and playing an audio stream from the cloud application platform, wherein the audio stream is obtained by the cloud application platform according to the text to be processed and the start-processing position information, and the start-processing position information is used to determine a starting point of the audio stream.

2. The method according to claim 1, wherein after receiving and playing an audio stream from the cloud application platform, the method further comprises:
when receiving a stop-listening instruction, sending a stop-listening message to the cloud application platform, so that the cloud application platform stops transmitting the audio stream to the mobile terminal.

3. The method according to claim 2, wherein before or after sending a stop-listening message to the cloud application platform, the method further comprises:
obtaining a text position mark, wherein the text position mark is used to indicate a stopping position, corresponding to a stopping point of the audio stream, of corresponding content in the text to be processed; and
displaying text content to which the text position mark is directed.

4. The method according to claim 1, further comprising:
when receiving an instruction for continuing to listen on another mobile terminal, sending a request message, which carries identifier information of the other mobile terminal and a listen-continuing instruction, to the cloud application platform, so that the cloud application platform continues to transmit the audio stream to the other mobile terminal.

5. The method according to claim 1, further comprising:
when receiving an instruction for continuing to read on another mobile terminal, sending a request message, which carries identifier information of the other mobile terminal and a read-continuing instruction, to the cloud application platform, so that the cloud application platform sends text record information to the other mobile terminal, so that the other mobile terminal obtains, by using the text record information, the text to be processed, and displays text content to which a text position mark comprised in the text record information is directed, wherein the text record information further comprises at least one of the text to be processed, the identifier of the text to be processed, or the obtaining address of the text to be processed, and the text position mark is used to indicate a position, corresponding to the stopping point of the audio stream, of corresponding content in the text to be processed.

6. A method for a mobile terminal to process text, the method comprising:
receiving, by a first mobile terminal, a response message from a cloud application platform, wherein the response message is sent by the cloud application platform, after receiving a request message, which comprises text information, start-processing position information, and identifier information of the first mobile terminal, from a second mobile terminal, to the first mobile terminal according to the identifier information of the first mobile terminal, wherein the text information comprises at least one of or any combination of text to be processed, an obtaining address of the text to be processed, and an identifier of the text to be processed; and receiving and playing, by the first mobile terminal, an audio stream from the cloud application platform, wherein the audio stream is obtained by the cloud application platform according to the text to be processed and the start-processing position information, the text to be processed is obtained by the cloud application platform according to the text information, and the start-processing position information is used to determine a starting point of the audio stream.

7. The method according to claim 6, wherein:
after receiving and playing, by the first mobile terminal, an audio stream from the cloud application platform, the method further comprises:
when receiving, by the first mobile terminal, a stop-listening instruction, sending a stop-listening message to the cloud application platform, so that the cloud application platform stops transmitting the audio stream to the first mobile terminal.

8. The method according to claim 7, wherein:
before or after sending a stop-listening message to the cloud application platform, the method further comprises:
obtaining, by the first mobile terminal, a text position mark, wherein the text position mark is used to indicate a stopping position, corresponding to a stopping point of the audio stream, of corresponding content in the text to be processed; and
displaying, by the first mobile terminal, text content to which the text position mark is directed.

9. The method according to claim 6, further comprising:
when receiving, by the first mobile terminal, an instruction for continuing to listen on another mobile terminal, sending a request message, which comprises identifier information of the another mobile terminal and a listen-continuing instruction, to the cloud application platform, so that the cloud application platform continues to transmit the audio stream to the another mobile terminal.

10. The method according to claim 6, further comprising:
when receiving, by the first mobile terminal, an instruction for continuing to read on another mobile terminal, sending a request message, which carries identifier information of the other mobile terminal and a read-continuing instruction, to the cloud application platform, so that the cloud application platform sends text record information to the other mobile terminal, so that the other mobile terminal obtains, by using the text record information, the text to be processed, and displays text content to which a text position mark comprised in the text record information is directed, wherein the text record information further comprises at least one of the text to be processed, the identifier of the text to be processed, or the obtaining address of the text to be processed, and the text position mark is used to indicate a position, corresponding to the stopping point of the audio stream, of corresponding content in the text to be processed.

11. A mobile terminal, comprising:
a sender, configured to send a request message, which carries text information and start-processing position information, to a cloud application platform, so that the cloud application platform obtains, according to the text information, text to be processed, wherein the text information comprises at least one of or any combination of the text to be processed, an obtaining address of the text to be processed, and an identifier of the text to be processed;
a receiver, configured to receive a response message, which is returned by the cloud application platform, of the request message; and
a playing unit, configured to receive and play, when or after the receiver receives the response message, which is returned by the cloud application platform, of the request message, an audio stream from the cloud application platform, wherein the audio stream is obtained by the cloud application platform according to the text to be processed and the start-processing position information, and the start-processing position information is used to determine a starting point of the audio stream.

12. The mobile terminal according to claim 11, wherein:
the receiver is further configured to receive a stop-listening instruction; and
the sender is further configured to send, when the receiver receives the stop-listening instruction, a stop-listening message to the cloud application platform, so that the cloud application platform stops transmitting the audio stream to the mobile terminal.

13. The mobile terminal according to claim 11, wherein the mobile terminal further comprises:
an obtaining unit, configured to obtain a text position mark, wherein the text position mark is used to indicate a stopping position, corresponding to a stopping point of the audio stream, of corresponding content in the text to be processed; and
a displaying unit, configured to display text content which is obtained by the obtaining unit and to which the text position mark is directed.

14. The mobile terminal according to claim 11, wherein:
the receiver is further configured to receive an instruction for continuing to listen on another mobile terminal; and
the sender is further configured to send, when the receiver receives the instruction for continuing to listen on another mobile terminal, a request message, which carries identifier information of the other mobile terminal and a listen-continuing instruction, to the cloud application platform, so that the cloud application platform continues to transmit the audio stream to the other mobile terminal.

15. The mobile terminal according to claim 11, wherein:
the receiver is further configured to receive an instruction for continuing to read on another mobile terminal; and
the sender is further configured to send, when the receiver receives the instruction for continuing to read on another mobile terminal, a request message, which carries identifier information of the other mobile terminal and a read-continuing instruction, to the cloud application platform, so that the cloud application platform sends text record information to the other mobile terminal, so that the other mobile terminal obtains, by using the text record information, the text to be processed, and displays text content to which a text position mark comprised in the text record information is directed, wherein the text record information further comprises at least one of the text to be processed, the identifier of the text to be processed, or the obtaining address of the text to be processed, and the text position mark is used to indicate a position, corresponding to a stopping point of the audio stream, of corresponding content in the text to be processed.

16. A mobile terminal, comprising:
a receiver, configured to receive a response message from a cloud application platform, wherein the response message is sent by the cloud application platform, after receiving a request message, which comprises text information, start-processing position information, and identifier information of a first mobile terminal, from a second mobile terminal, to the first mobile terminal according to the identifier information of the first mobile terminal, wherein the text information comprises at least one of or any combination of text to be processed, an obtaining address of the text to be processed, and an identifier of the text to be processed; and
a playing unit, configured to receive and play an audio stream from the cloud application platform, wherein the audio stream is obtained by the cloud application platform according to the text to be processed and the start-processing position information, the text to be processed is obtained by the cloud application platform according to the text information, and the start-processing position information is used to determine a starting point of the audio stream.

17. The mobile terminal according to claim 16, wherein:
when the receiver is further configured to receive a stop-listening instruction,
the mobile terminal further comprises:
a sender, configured to send, when the receiver receives the stop-listening instruction, a stop-listening message to the cloud application platform, so that the cloud application platform stops transmitting the audio stream to the first mobile terminal.

18. The mobile terminal according to claim 16, wherein the mobile terminal further comprises:
an obtaining unit, configured to obtain a text position mark, wherein the text position mark is used to indicate a stopping position, corresponding to a stopping point of the audio stream, of corresponding content in the text to be processed; and
a displaying unit, configured to display text content which is obtained by the obtaining unit and to which the text position mark is directed.

19. The mobile terminal according to claim 16, wherein:
the receiver is further configured to receive an instruction for continuing to listen on another mobile terminal; and
the mobile terminal further comprises:
the sender, configured to send, when the receiver receives the instruction for continuing to listen on another mobile terminal, a request message, which carries identifier information of the another mobile terminal and a listen-continuing instruction, to the cloud application platform, so that the cloud application platform continues to transmit the audio stream to the another mobile terminal.

20. The mobile terminal according to claim 16, wherein:
the receiver is further configured to receive an instruction for continuing to read on another mobile terminal; and
the mobile terminal further comprises:
the sender, configured to send, when the receiver receives the instruction for continuing to read on the other mobile terminal, a request message, which carries identifier information of the other mobile terminal and a read-continuing instruction, to the cloud application platform, so that the cloud application platform sends text record information to the other mobile terminal, so that the other mobile terminal obtains, by using the text record information, the text to be processed, and displays text content to which a text position mark comprised in the text record information is directed, wherein the text record information further comprises at least one of the text to be processed, the identifier of the text to be processed, or the obtaining address of the text to be processed, and the text position mark is used to indicate a position, corresponding to a stopping point of the audio stream, of corresponding content in the text to be processed.

* * * * *